US008290773B2

(12) United States Patent
Washio

(10) Patent No.: US 8,290,773 B2
(45) Date of Patent: Oct. 16, 2012

(54) INFORMATION PROCESSING APPARATUS, METHOD AND RECORDING MEDIUM FOR GENERATING ACOUSTIC MODEL

(75) Inventor: Nobuyuki Washio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 12/645,476

(22) Filed: Dec. 22, 2009

(65) Prior Publication Data

US 2010/0169093 A1 Jul. 1, 2010

(30) Foreign Application Priority Data

Dec. 26, 2008 (JP) ................................. 2008-332090
Jul. 14, 2009 (JP) ................................. 2009-165595

(51) Int. Cl.
*G10L 15/06* (2006.01)

(52) U.S. Cl. ....................................................... 704/243

(58) Field of Classification Search ................... 704/231, 704/235, 243–245
See application file for complete search history.

(56) References Cited

U.S. PATENT DOCUMENTS

| 5,737,487 | A * | 4/1998 | Bellegarda et al. ........... 704/250 |
| 6,253,181 | B1 * | 6/2001 | Junqua ......................... 704/255 |
| 6,442,519 | B1 * | 8/2002 | Kanevsky et al. ............ 704/243 |
| 6,697,778 | B1 * | 2/2004 | Kuhn et al. ................... 704/243 |
| 7,016,838 | B2 * | 3/2006 | Rockenbeck et al. ........ 704/244 |
| 7,113,908 | B2 * | 9/2006 | Goronzy et al. .............. 704/244 |
| 7,315,811 | B2 * | 1/2008 | Cote et al. ......................... 704/9 |
| 7,472,061 | B1 * | 12/2008 | Alewine et al. ............... 704/243 |
| 2007/0294082 | A1 * | 12/2007 | Jouvet et al. .................. 704/231 |
| 2008/0147404 | A1 * | 6/2008 | Liu et al. ..................... 704/256.2 |
| 2008/0215322 | A1 * | 9/2008 | Fischer et al. ................ 704/243 |
| 2009/0119105 | A1 * | 5/2009 | Kim et al. ..................... 704/244 |

FOREIGN PATENT DOCUMENTS

| JP | 2003-177779 A | 6/2003 |
| JP | 2003-255980 A | 9/2003 |
| JP | 2005-283646 A | 10/2005 |

* cited by examiner

*Primary Examiner* — Douglas Godbold
(74) *Attorney, Agent, or Firm* — Fujitsu Patent Center

(57) ABSTRACT

An information processing apparatus for speech recognition includes a first speech dataset storing speech data uttered by low recognition rate speakers; a second speech dataset storing speech data uttered by a plurality of speakers; a third speech dataset storing speech data to be mixed with the speech data of the second speech dataset; a similarity calculating part obtaining, for each piece of the speech data in the second speech dataset, a degree of similarity to a given average voice in the first speech dataset; a speech data selecting part recording the speech data, the degree of similarity of which is within a given selection range, as selected speech data in the third speech dataset; and an acoustic model generating part generating a first acoustic model using the speech data recorded in the second speech dataset and the third speech dataset.

20 Claims, 12 Drawing Sheets

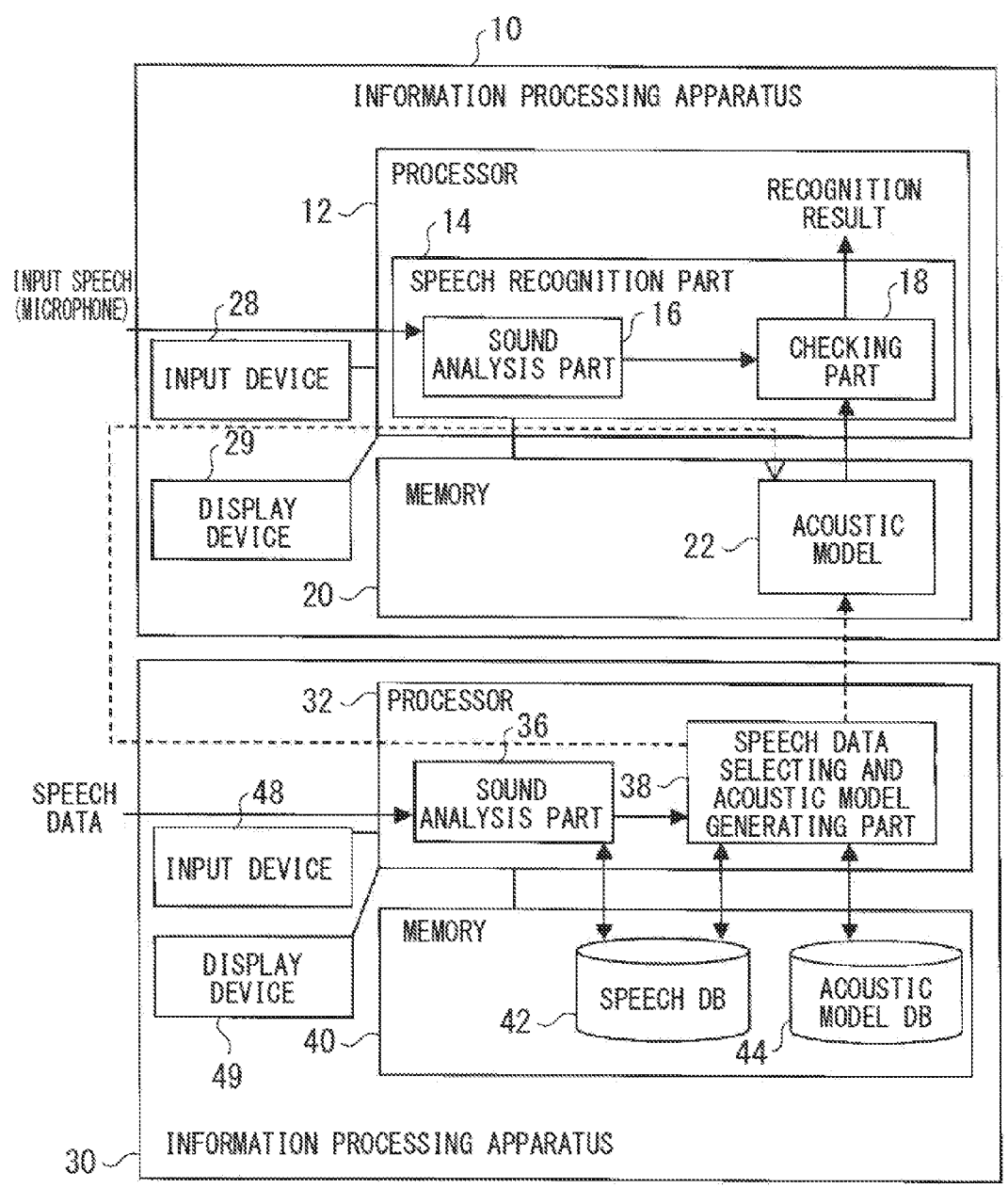

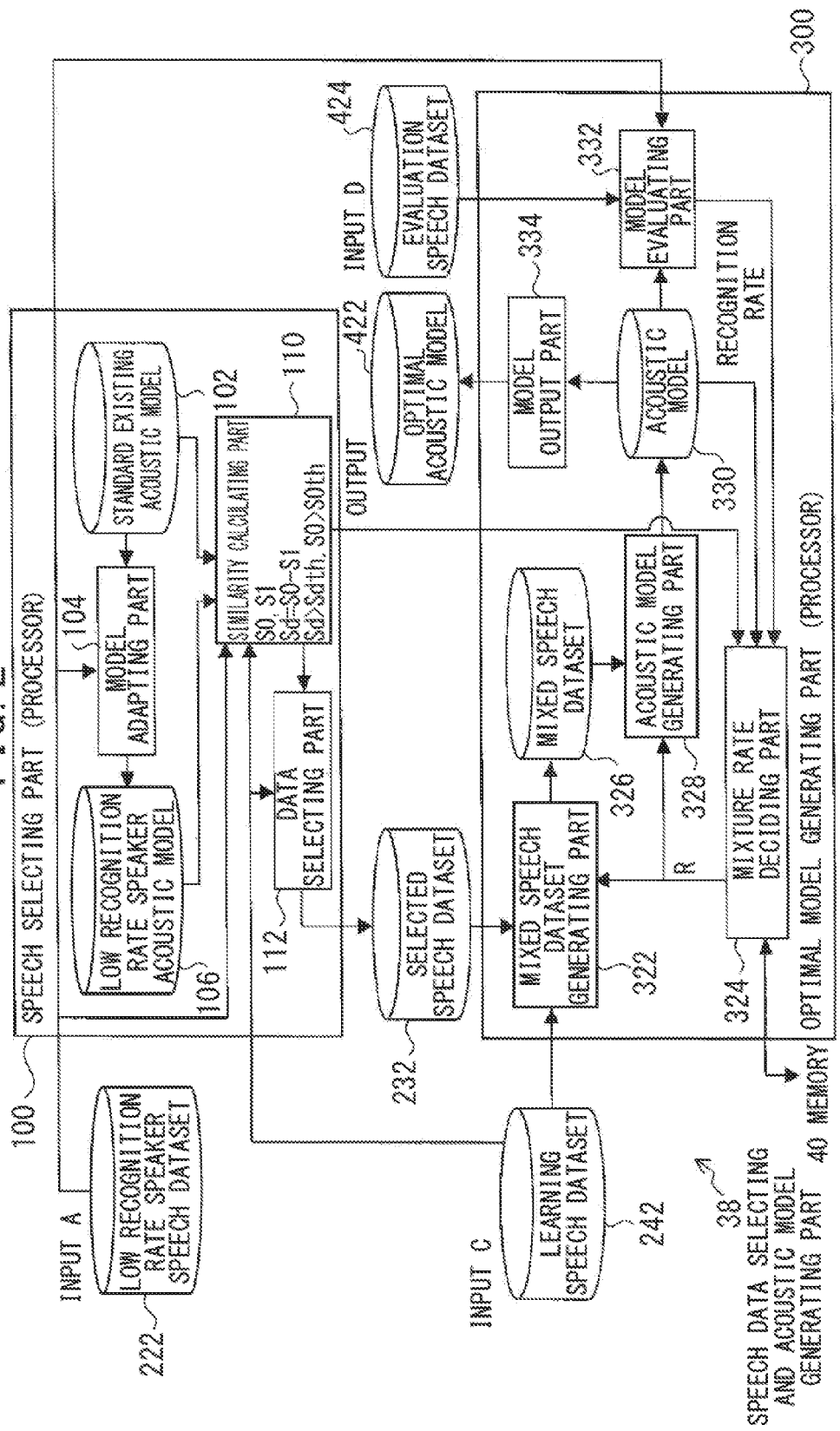

EXAMPLE 1 R=Sd/Smax*Rmax

EXAMPLE 2 R=(1-C/Cmax)*Rmax

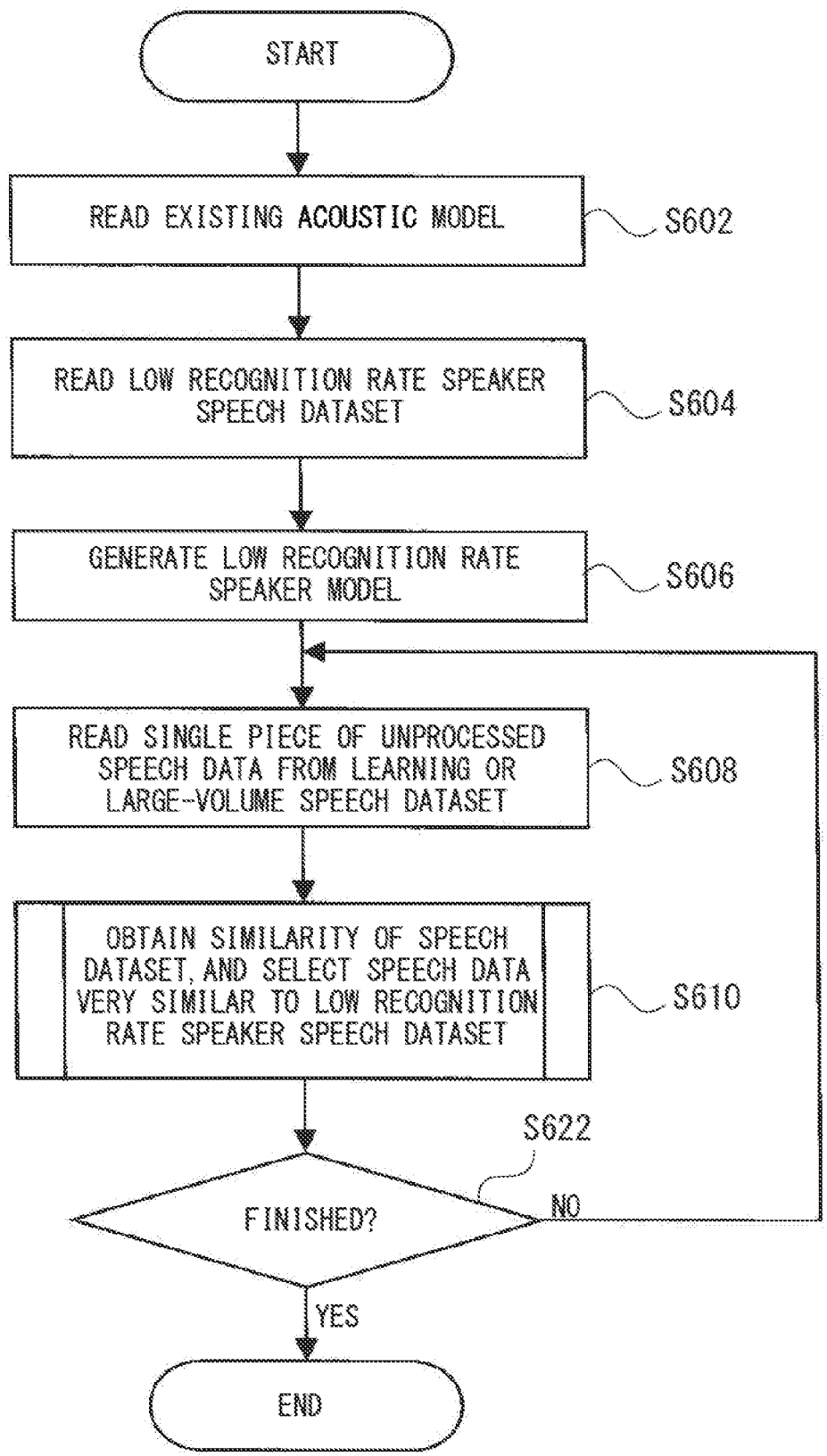

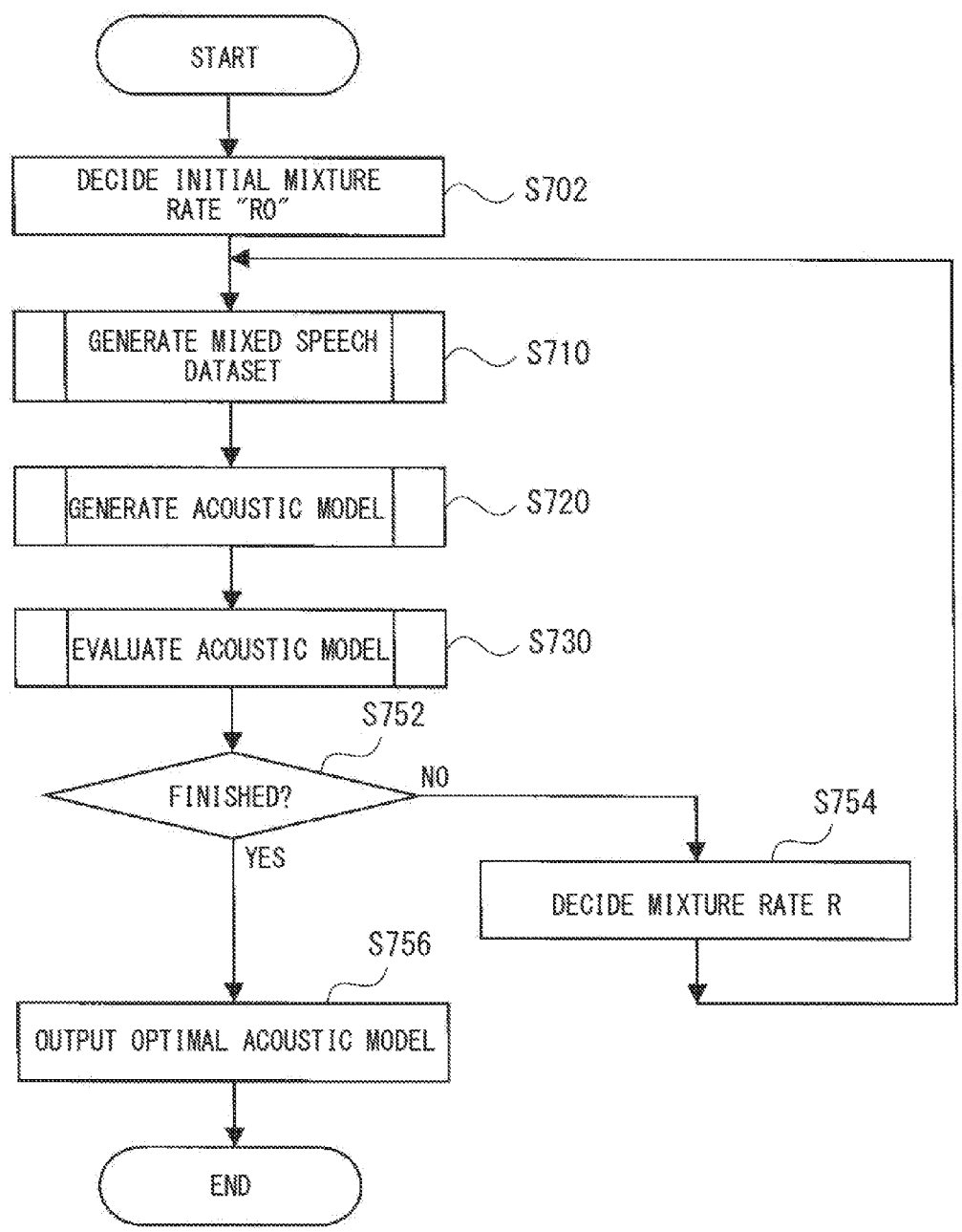

INFORMATION PROCESSING APPARATUS, METHOD AND RECORDING MEDIUM FOR GENERATING ACOUSTIC MODEL

CROSS-REFERENCE TO RELATED APPLICATIONS

This application is based upon and claims the benefit of priority of the prior Japanese Patent Application No. 2008-332090, filed on Dec. 26, 2008 and the prior Japanese Patent Application No. 2009-165595, filed on Jul. 14, 2009, the entire contents of which are incorporated herein by reference.

FIELD

The embodiments are related to an acoustic model used for speech recognition, and in particular are related to selection of speech data for generating an acoustic model used for speech recognition.

BACKGROUND

Conventionally, in a method for generating an acoustic model for speech recognition, a speech dataset and a correct answer text representing the speech dataset's uttered contents are used as learning data to perform a learning process (model parameter estimation) based on a criterion such as a maximum likelihood (ML) criterion, a maximum mutual information (MMI) criterion, a minimum classification error (MCE) criterion, a minimum word error (MWE) criterion, or a minimum phoneme error (MPE) criterion, thereby generating an acoustic model. Alternatively, a speech dataset and its correct answer text are used as adaptive (training) data to perform an adaptation process on an existing acoustic model. In either the learning process or adaptation process, the process is performed so that speech data of a learning or adaptive speech dataset may be successfully recognized, thus optimizing a parameter of an acoustic model (see Japanese Laid-open Patent Application Publication No. 2005-283646).

Conventionally, an acoustic model creation apparatus includes the following components. A sound analysis part extracts acoustic features from each of speech data stored in a speech data storage part. A frequency spectrum expansion/contraction part expands/contracts the frequency spectrum of these acoustic features in a frequency axis direction. An acoustic model generating part generates an acoustic model using the acoustic features, the frequency spectrum of which has been expanded/contracted or the frequency spectrum of which has not been expanded/contracted. Accordingly, if the frequency spectrum expansion/contraction is carried out with mapping using a map function by which a child speech data is obtained in a pseudo manner from an adult female speech data, for example, child acoustic features may be increased in a pseudo manner based on the adult female speech data or adult female acoustic features. Thus, even if speech data of an actual child and/or speech data for an actual unspecified speaker is not further collected, the accuracy of an acoustic model associated with child speech data may be increased, and/or the accuracy of an acoustic model for an unspecified speaker may be increased (see Japanese Laid-open Patent Application Publication No. 2003-255980).

Conventionally, a speech recognition rate estimation apparatus includes the following components. A CPU generates virtual vocalization data by performing speech synthesis using speech pieces, and simulates the influence of a sonic environment by synthesizing the generated virtual vocalization data with sonic environment data. The sonic environment data is provided by recording noise data of various environments, and is superimposed on the virtual vocalization data, thereby making it possible to bring the virtual vocalization data closer to an actual speech output environment. The CPU performs speech recognition using the virtual vocalization data by which the influence of the sonic environment is simulated, thus estimating a speech recognition rate. As for a word whose recognition rate is low, the recognition rate may be estimated by recording actual vocalization data actually uttered by a user with the use of a microphone; on the other hand, as for a word whose recognition rate is high, the recognition rate may be estimated based on the virtual vocalization data obtained by performing speech synthesis using speech pieces (see Japanese Unexamined Patent Application Publication No. 2003-177779).

SUMMARY

According to an aspect of the invention, an information processing apparatus that generates a first acoustic model for speech recognition, the information apparatus includes: a first speech dataset storing speech data uttered by low recognition rate speakers; a second speech dataset storing speech data uttered by a plurality of speakers; a third speech dataset storing speech data to be mixed with the speech data of the second speech dataset; a similarity calculating part obtaining, for each piece of the speech data in the second speech dataset, a degree of similarity to a given average voice in the first speech dataset; a speech data selecting part recording the speech data, the degree of similarity of which is within a given selection range, as selected speech data in the third speech dataset; and an acoustic model generating part generating a first acoustic model using the speech data recorded in the second speech dataset and the third speech dataset.

The object and advantages of the embodiment discussed herein will be realized and attained by means of elements and combinations particularly pointed out in t in a pseudo manner he claims.

It is to be understood that both the foregoing general description and the following detailed and the following detailed description are exemplary and only are not restrictive exemplary explanatory are not restrictive of the invention, as claimed.

BRIEF DESCRIPTION OF DRAWINGS

FIG. 1 depicts an example of a schematic configuration according to an embodiment of the present invention for generating an acoustic model, and for performing speech recognition using the generated acoustic model.

FIG. 2 depicts an example of a more detailed configuration including a speech data selecting and acoustic model generating part depicted in FIG. 1, and a speech database and an acoustic model database that are related thereto.

FIG. 5 depicts an example of an operation chart of a process for speech data selection at operation S600 of FIG. 4, which is executed by a speech selecting part depicted in FIG. 2 or FIG. 11.

FIG. 7 depicts an example of a schematic operation chart of a process for optimal model generation at operation S700 of FIG. 4, which is executed by an optimal model generating part depicted in FIG. 2 or FIG. 11.

DESCRIPTION OF EMBODIMENTS

Figure 3A:
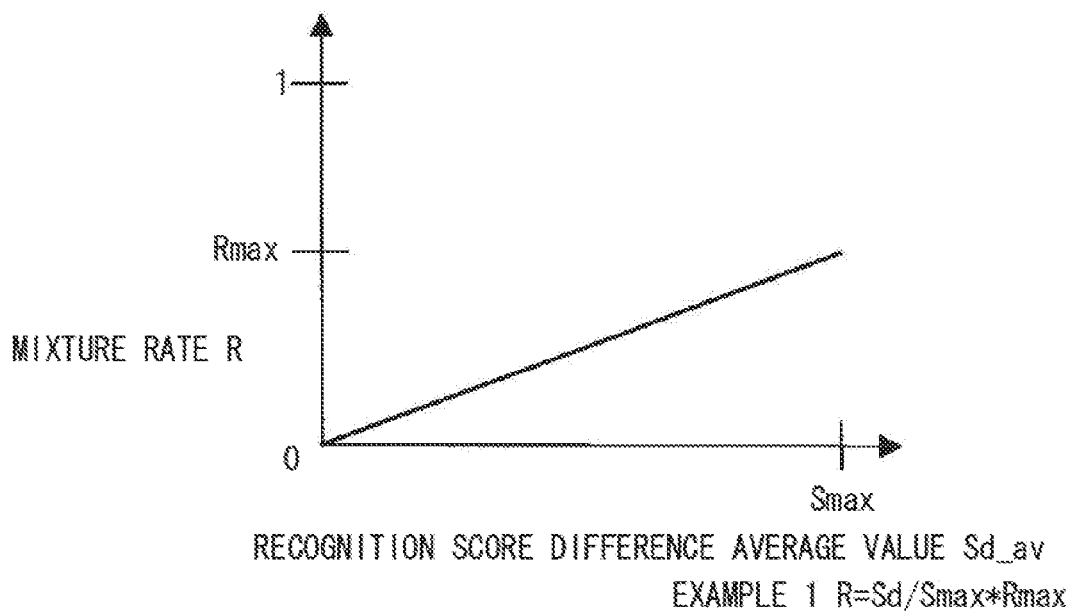
FIG. 3A depicts one example of the relationship of a mixture rate with respect to an average value of recognition score differences or similarities, which is used by a mixture rate deciding part depicted in FIG. 2 or FIG. 11.

A speech recognition apparatus may depict a low recognition rate for speech data of a specific speaker having a small number of unique features.

The present inventor recognized that it is desirable for a speech recognition apparatus to stably realize a high recognition rate for various speakers including a user who uses the apparatus for the first time; and, in order to reduce the number of speakers whose recognition rates are low, it is preferable to generate an acoustic model which provides an improved recognition rate for such speakers. Therefore, the present inventor recognized that it is preferable to prepare a large number of pieces of speech data similar to a small number of pieces of speech data of speakers whose recognition rates are low.

An aspect of an embodiment of the present invention is to select speech data similar to speech data having a low recognition rate in order to generate an acoustic model.

Another aspect of an embodiment is to generate an acoustic model more suitable for speech data having a low recognition rate.

Conventionally, in a speaker learning method for speech recognition, whether or not vocalization contents depend on a recognition result of a low vocalization is estimated. When it is estimated that the vocalization contents do not depend on the recognition result, speaker adaptive leaning is carried out; and when it is estimated that the vocalization contents depend on the recognition result, the speaker registration learning is carried out. Thus, a recognition rate may be reliably improved by a learning vocalization that does not impose burdens on a speaker.

According to an embodiment of the present invention, speech data similar to speech data having a low recognition rate may be selected in order to generate an acoustic model, and furthermore, an acoustic model more suitable for speech data having a low recognition rate may be generated.

The foregoing general description and the following detailed descriptions are intended to provide typical examples and descriptions thereof, and are not intended to limit the present invention.

The embodiments of the present invention will be described with reference to the drawings. In the drawings, the same components are identified by the same reference numerals.

FIG. 1 depicts an example of a schematic configuration according to an embodiment of the present invention for generating an acoustic model, and for performing speech recognition using the generated acoustic model.

An information processing apparatus 10 is an apparatus including a speech recognition function used, for example, for dictation, hand-free computing, automatic speech response, etc. An information processing apparatus 30 has the function of generating an acoustic model used for speech recognition in the information processing apparatus 10. The information processing apparatuses 10 and 30 may be provided as a single integrated information processing apparatus.

The information processing apparatus 10 includes: a processor 12; a memory 20; an input device 28; and a display device 29. A speech recognition part 14 is implemented in the form of hardware (dedicated integrated circuit) or software (program) on the processor 12. The memory 20 stores an acoustic model 22, a program, and other data. The speech recognition part 14 includes a sound analysis part 16 for analyzing input speech data, and a checking part 18 for checking speech data against the acoustic model 22. The memory 20 may store a program for realizing a function of the speech recognition part 14, which is executed by the processor 12. The input device 28 includes: a keyboard; a storage medium reader; a pointing device; and/or a speech input interface.

The information processing apparatus 30 includes: a processor 32; a memory 40; an input device 48; and a display device 49. A sound analysis part 36 and a speech data selecting and acoustic model generating part 38 are implemented in the form of hardware (dedicated integrated circuit) or software (program) on the processor 32. The memory 40 stores, for example, a speech database 42, an acoustic model database 44, a program, other data, etc. The memory 40 may store a program for realizing a function of the speech data selecting and acoustic model generating part 38, which is executed by the processor 32. The speech database 42 stores digital speech data used for acoustic model generation. The input device 48 includes: a keyboard; a storage medium reader; and/or a pointing device. When the size of the speech database is large, the entity of the memory 40 may be a combination of a high-speed semiconductor memory such as a SDRAM and a low-speed and large-capacity external secondary storage device such as a hard disk drive.

The sound analysis part 16 of the information processing apparatus 10 and the sound analysis part 36 of the information processing apparatus 30 each extract a sonic feature amount from speech data received from outside or from the speech database 42. Examples of the sonic feature amount include one obtained by MFCC (Mel-Frequency Cepstrum Coefficient) or LPC (Linear Prediction Analysis) Mel-Cepstrum, which describes a speech frequency spectrum.

The speech data selecting and acoustic model generating part 38 (328) generates an acoustic model using the sonic feature amount extracted by the sound analysis part 36, stores the generated acoustic model in the acoustic model database 44, supplies the acoustic model 22 to the information processing apparatus 10, and sets the acoustic model 22 therein. Examples of the acoustic model 22 include: a model provided by representing, as a standard pattern, a mean vector of the sonic feature amounts obtained from a large-volume learning speech dataset for each recognition unit (e.g., phoneme, syllable, or word); and an HMM (Hidden Markov Model) provided by probabilistic modeling of statistical feature amounts.

FIG. 2 depicts an example of a more detailed apparatus configuration including the speech data selecting and acoustic model generating part 38 depicted in FIG. 1, and the speech database 42 and acoustic model database 44 that are related thereto.

Conventionally, a standard existing acoustic model 102 used as the acoustic model 22 depicted in FIG. 1 is generated by an acoustic model generating part 328 using a standard learning speech dataset 242 provided by a number of speakers (e.g., data collected in bulk without being arbitrarily biased). The standard existing acoustic model allows the speech of an unspecified speaker to be widely recognized by extracting features of speech data of standard or a majority of speakers included in the learning speech dataset.

On the other hand, when the existing acoustic model 102 is used to perform speech recognition on the speech data of a minority of speakers having unique speech features, the existing acoustic model 102 may be an aggregate of data collected for general-purpose speech recognition. Therefore, the recognition rate (success rate) for the speech data of a minority of speakers having unique speech features is reduced. Whereas, even if a speech dataset of a larger plurality of speakers and/or a large-volume speech dataset including speech data recorded by many various input systems is used to generate an acoustic model in order to increase speech data used for acoustic model learning, no change occurs in the tendency that the recognition rate for the speech of the minority of speakers having unique speech features is low. Further, it is generally hard to collect a sufficient amount of speech data of speakers having unique speech features, and therefore, the number of pieces of data to be used for acoustic model learning is insufficient.

When the data amount of the learning speech dataset (242) is equal to or higher than a given level, there will not be much difference in the performance of the generated acoustic model even if all pieces of data in such a large-volume speech dataset are used as the learning speech dataset.

The present inventor recognized that the number of pieces of speech data, which are included in the learning speech dataset (242) and approximately meets an actual use condition, may be increased in consideration of an input system (e.g., microphone positions, microphone frequency characteristic, noise environment) and the like connected to the speech recognition part 14 in the information processing apparatus 10. Furthermore, the present inventor recognized that only speech data that is included in the large-volume speech dataset and approximately meets an actual use condition may be mixed with the learning speech dataset.

The present inventor recognized that it is preferable to generate an acoustic model that enables correct recognition of not only the speech of standard or a majority of speakers, but also the speech of a minority of speakers.

The present inventor recognized that if speech data having features similar to those of a small number of pieces of speech data of the minority of speakers is selected from an existing speech dataset, and the speech data is added to speech dataset for acoustic model generation to generate an acoustic model, the speech recognition rate for the minority of speakers is improved while the speech recognition rate for the majority of speakers is maintained.

In FIG. 2, the speech data selecting and acoustic model generating part 38 depicted in FIG. 1 includes a speech selecting part 100 and an optimal model generating part 300, which are implemented on the processor 32.

The speech selecting part 100 includes a model adapting part 104, a similarity calculating part 110, and data selecting part 112. The speech selecting part 100 uses a low recognition rate speaker speech dataset 222 and a learning speech dataset (provided with a correct answer text representing vocalization contents) 242, which are stored in the speech database 42, and a standard existing acoustic model 102 stored in the acoustic model database 44.

Given speech data in the learning speech dataset 242 serves as a candidate that is to be mixed with or added to speech data of the learning speech dataset 242 in the optimal model generating part 300. Specifically, the given speech data is included in the learning speech dataset 242 and selected by the speech selecting part 100. Some of the given speech data is further added to speech data from the learning speech dataset 242 in an overlapping manner in the optimal model generating part 300. Therefore the amount of given speech data is increased and used.

The learning speech dataset 242 is an aggregate of sets of data collected for learning speech data uttered by a number of speakers. The learning speech dataset 242 is used to generate the standard existing acoustic model 102, for example. The learning speech dataset 242 has several tens of thousands to several hundreds of thousands of pieces of data (e.g., number of vocalizations), for example. The number of pieces of data in the low recognition rate speaker speech dataset 222 is small. The low recognition rate speaker speech dataset 222 has several tens of pieces of data (e.g., number of vocalizations), for example. The number of pieces of data in the low recognition rate speaker speech dataset 222 is far smaller than the number of pieces of data in the learning speech dataset 242. As the acoustic model, for example, an HMM acoustic model, a neural network acoustic model, etc., are known.

Information such as a data attributes, speaker attributes (gender, age, height classification, and/or weight classification), vocal environment, input system (e.g., microphone), noise environment, and/or presence or absence of reverberation may be added to each piece of speech data in the learning speech dataset 242. The speech datasets include, as a data unit, for example, a file of speech data for each of the numbers of phonemes, for each of the numbers of syllables, or for each of the numbers of words, and/or net time length-specific speech data.

The low recognition rate speaker speech dataset 222 includes a small number of pieces of speech data (e.g., several tens of pieces of speech data) of one or several speakers (e.g., a small number of files and/or a small number of pieces of data of one or several speakers), which may be difficult to be correctly recognized by the speech recognition part 14 of the information processing apparatus 10. For example, the small number of pieces of speech data is regarded as having unique features. The unique features may be features of an uncommon dialect, and/or features concerning an uncommon vocalism, for example. It is preferable to generate an optimal acoustic model 422 applicable to both of the following speakers. For example, the optimal acoustic model 422 is not only suitable for speakers having a general feature exhibiting a high degree of the speech recognition rate and included in the learning speech dataset 242, but also suitable for speakers having a unique feature included in the low recognition rate speaker speech dataset 222. Therefore, the use of only the small-volume low recognition rate speaker speech dataset 222 as an additional learning speech dataset is insufficient.

Using a model adapting technique (speaker adaptation technique), the model adapting part 104 adapts the existing acoustic model 102 based on the small-volume low recognition rate speaker speech dataset 222, thereby modifying the existing acoustic model 102 and generating a low recognition rate speaker acoustic model 106. Examples of this model adapting technique may include at least one of MLLR (Maximum Likelihood Linear Regression), MAP (Maximum A Posteriori), and Eigenvoice. Examples of modification may include movement and/or rotation of a parameter such as a mean vector or a distributed vector of the acoustic model 102. The model adapting part 104 stores the low recognition rate speaker acoustic model 106 in the acoustic model database 44. For example, the model adapting part 104 analyzes the statistical distribution of the frequency spectrum of the low recognition rate speaker speech dataset 222. The model adapting part 104 modifies the parameter of the existing acoustic model 102 so that the statistical distributions of frequency spectrums of both of the existing acoustic model 102 and the low recognition rate speaker speech dataset 222 become substantially equal to each other. The model adapting part 104 sets the modified acoustic model as the low recognition rate speaker acoustic model 106.

The low recognition rate speaker acoustic model 106 represents an average voice feature included in the low recognition rate speaker speech dataset 222. The low recognition rate speaker acoustic model 106 is used to obtain the degree of similarity or recognition score of given speech data with respect to the average voice in the low recognition rate speaker speech dataset 222. The existing acoustic model 102 represents an average voice feature included in the learning speech dataset 242 used for generation of the acoustic model 102, and is used to obtain the degree of similarity or recognition score of given speech data with respect to the average voice in the learning speech dataset 242.

The similarity calculating part 110 uses or includes a speech recognition function for performing speech recognition using acoustic models. The similarity calculating part 110 uses the low recognition rate speaker acoustic model 106 and the existing acoustic model 102 to perform speech recognition on each of all pieces of speech data in the learning speech dataset 242 in accordance with the texts thereof, thereby generating recognition scores (e.g., log likelihoods) S0 and S1 ($0 \leq S0 \leq 1$, $0 \leq S1 \leq 1$) of the respective pieces of speech data.

Next, the similarity calculating part 110 makes a comparison between the recognition score S0 of each piece of speech data in the learning speech dataset 242 obtained using the low recognition rate speaker acoustic model 106 and the recognition score S1 of this speech dataset (242) obtained using the existing acoustic model 102, thus calculating a difference Sd (=S0−S1) between the recognition scores of S0 and S1. The similarity calculating part 110 determines, speech data falling within a selection range in which the recognition score difference Sd is greater than a threshold value Sdth (e.g., Sd>Sdth, S0>S1+Sdth) as speech data relatively similar to the low recognition rate speaker speech dataset 222, and supplies the identification information of the speech data to the data selecting part 112. A large recognition score difference Sd indicates that the low recognition rate speaker acoustic model 106 is more suitable for recognition of this speech data than the existing acoustic model 102.

In an alternative configuration, the similarity calculating part 110 may determine speech data falling within a selection range in which the recognition score S0 of each piece of speech data in the learning speech dataset 242 obtained using the low recognition rate speaker acoustic model 106 is greater than a threshold value S0th as speech data very similar to the low recognition rate speaker speech dataset 222, and may supply the identification information of this speech data to the data selecting part 112. In this case, the threshold value S0th may be, for example, the sum of an estimated average value S1_av of the recognition scores S1 of speech data obtained using the acoustic model 102 and the threshold value Sdth (S0th>S1_av+Sdth).

The data selecting part 112 selects the corresponding speech data (provided with a text) from the learning speech dataset 242 in accordance with the identification information thereof, and records the selected speech data in a selected speech dataset 232. The number of pieces of data in the selected speech dataset 232 is sufficiently larger than the number of pieces of data in the low recognition rate speaker speech dataset 222, and the selected speech dataset 232 has several hundreds to several thousands of pieces of data (e.g., number of vocalizations), for example. Thus, the speech data that is similar to the small-volume low recognition rate speaker speech dataset 222 and the amount of which is preferable to learn may be selected from the learning speech dataset 242.

In a speech recognition system, the likelihood of an estimation result (e.g., speech recognition result) of vocalization contents of speech data is usually expressed as a numerical value indicating a recognition score or a reliability, and speech data having a maximum likelihood value exhibits a maximum recognition score.

In many cases, a small number of pieces of speech data recognition score is calculated, for example, by adding, as a language score, the probability of occurrence of word sequence using a probabilistic language model based on a score checked against an acoustic model (distance from a template and/or HMM output probability), or by introducing another mechanism for recognition rate improvement such as a word insertion penalty.

Accordingly, the learning of the acoustic model 102 is reflected on a speech recognition score, and/or the distance from a feature amount space of the low recognition rate speaker speech dataset 222 used as adaptive data in model adapting for generating the low recognition rate speaker acoustic model 106 is reflected on a speech recognition score. In other words, the speech recognition score obtained using the low recognition rate speaker acoustic model 106 reflects the degree of similarity between the feature of a sound (feature amount space) of the low recognition rate speaker speech dataset 222 used as learning data or adaptive data for the low recognition rate speaker acoustic model 106, and the feature of a voice of each piece of speech data in the learning speech dataset 242 on which speech recognition has been performed.

Further, it is preferable to perform continuous word recognition including isolated word recognition in accordance with a correct answer text of the learning speech dataset 242, e.g., under the constraint that a recognized vocabulary sequence matches the correct answer text, so that the influences of false recognition on recognition scores may be reduced.

Furthermore, it is not the objective of the similarity calculating part 110 to recognize vocalization contents. Accordingly, the existing acoustic model 102 and the low recognition rate speaker acoustic model 106 may not be high-accuracy acoustic models such as those used for speech recognition in the information processing apparatus 10, but simple models such as a monophone (e.g., a model by which a single phoneme is defined) may alternatively be used. The high-accuracy acoustic model is a triphone (e.g., a model by which a center phoneme and preceding and subsequent phonemes are considered), for example.

Alternatively, a method other than speech recognition may be used in calculating the degree of similarity between speech data in the low recognition rate speaker speech dataset 222 and speech data in the learning speech dataset 242.

Without the use of any acoustic model, for example, a feature amount distribution space of the learning speech dataset 242 or the low recognition rate speaker speech dataset 222 as adaptive data, and/or the distance between features of speech data may be used. In other words, no constraint is imposed on acoustic models and matching algorithms as long as they are used as scales for determining the degree of similarity.

For example, without the use of any acoustic model for speech recognition (for each minimum recognition unit, e.g., for each phoneme), the feature amount distribution space of the learning speech dataset 242 or the low recognition rate speaker speech dataset 222 as adaptive data may be represented using a more simplified GMM model. The matching of the GMM model and each piece of speech data of the learning speech dataset 242 may be performed (e.g., by dynamic programming such as a Viterbi algorithm), and an accumulated likelihood obtained at this time may be utilized as a degree of similarity.

The optimal model generating part 300 includes: a mixed speech dataset generating part 322; a mixture rate deciding part 324; an acoustic model generating part 328; a model evaluating part 332; and a model output part 334.

The acoustic model generating part 328 uses the speech recognition function for learning and/or includes the speech recognition function for learning. The model evaluating part 332 uses the speech recognition function for evaluation and/or includes the speech recognition function for evaluation.

The optimal model generating part 300 generates and regenerates an acoustic model 330 by using the selected speech dataset (provided with a correct answer text) 232, the learning speech dataset (provided with a correct answer text) 242, a mixed speech dataset 326, and an evaluation speech dataset (provided with a correct answer text) 424, which are stored in the speech database 42. The optimal model generating part 300 stores, as the optimal acoustic model 422, the finally generated acoustic model 330 in the acoustic model database 44.

The number of pieces of data in the low recognition rate speaker speech dataset 222 and the number of pieces of data in the learning speech dataset 242 have a relative quantitative relationship, and are therefore not limited to the numbers of pieces of data illustrated in the embodiment.

Figure 11:
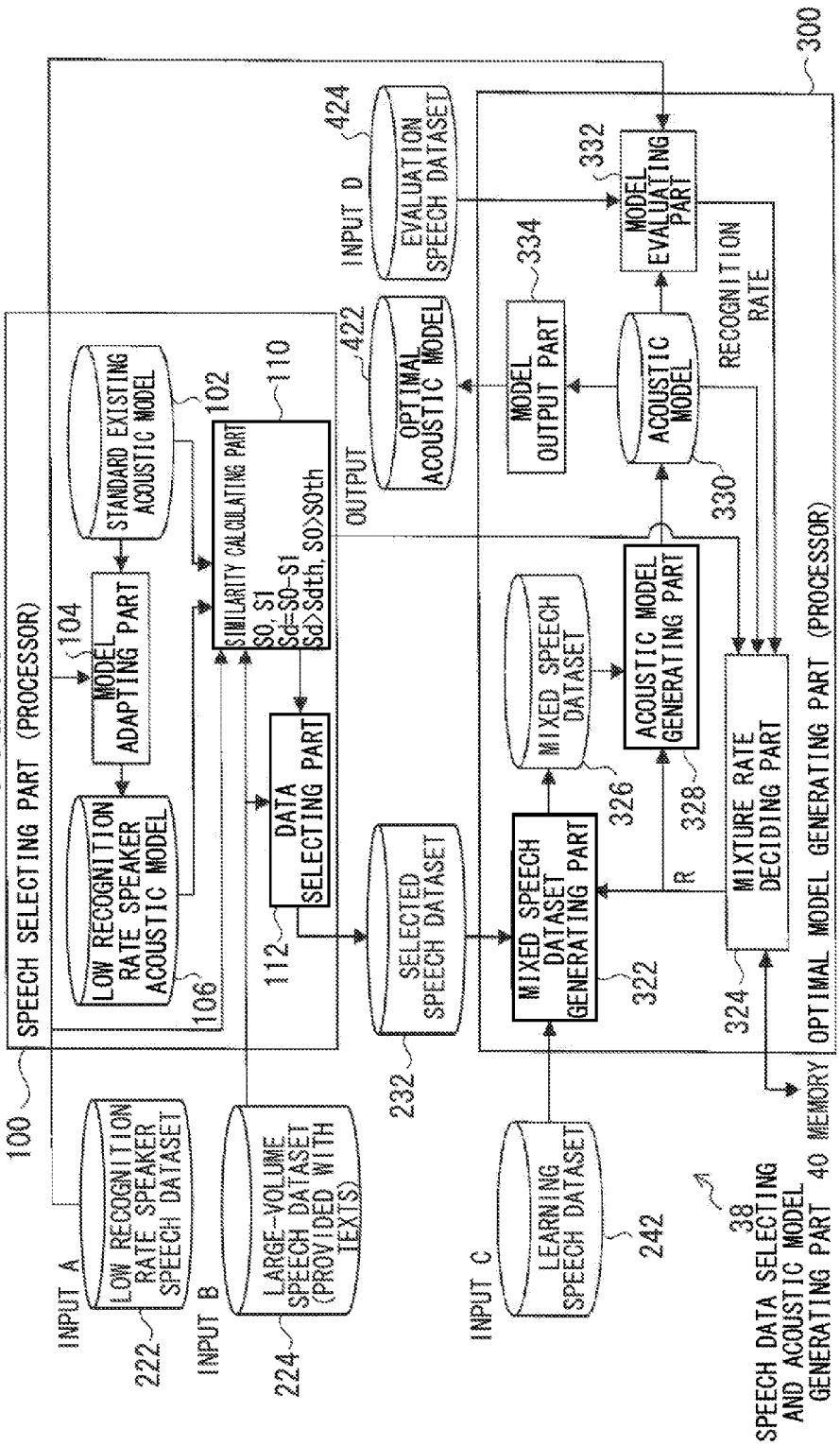
FIG. 11 depicts an example of a variation of the embodiment depicted in FIG. 2, and more specifically depicts another example of an apparatus including configuration of a speech data selecting part and an acoustic model generating part.

FIG. 11 depicts an example of another variation of the embodiment depicted in FIG. 2, and more specifically depicts another example of an apparatus configuration of the speech data selecting and acoustic model generating part 38.

The speech selecting part 100 depicted in FIG. 11 uses a large-volume speech dataset (provided with texts representing vocalization contents) 224 in addition to the low recognition rate speaker speech dataset 222 stored in the speech database 42. Further, the speech selecting part 100 uses the standard existing acoustic model 102 stored in the acoustic model database 44. The large-volume speech dataset (provided with texts) 224 is an aggregate of sets of speech data serving as candidates to be mixed with or added to speech data of the learning speech dataset 242, and may be an existing speech dataset of a number of speakers collected in advance. The large-volume speech dataset (provided with texts) 224 has several hundreds of thousands of pieces of data (e.g., number of vocalizations), for example. The number of pieces of data in the low recognition rate speaker speech dataset 222 is far smaller than the number of pieces of data in the large-volume speech dataset 224.

Information such as a data attribute, a speaker attribute (gender, age, height classification, and/or weight classification), vocal environment, an input system (e.g., microphone), noise environment, and/or the presence or absence of reverberation may be added to each piece of speech data in the large-volume speech dataset (provided with texts) 224. Each speech dataset includes, as a data unit, for example, a file of speech data for each of the numbers of phonemes, for each of the numbers of syllables, or for each of the numbers of words, and/or a net time length for each speech data.

The similarity calculating part 110 uses the low recognition rate speaker acoustic model 106 and the existing acoustic model 102 to perform speech recognition on all pieces of speech data in the large-volume speech dataset (provided with texts) 224 in accordance with the texts thereof, thereby generating recognition scores (e.g., log likelihoods) S0 and S1 ($0 \leq S0 \leq 1$, $0 \leq S1 \leq 1$) of the respective pieces of speech data.

Next, the similarity calculating part 110 makes a comparison between the recognition score S0 of each piece of speech data in the speech dataset 224 obtained using the low recognition rate speaker acoustic model 106, and the recognition score S1 of the speech dataset (224) obtained using the existing acoustic model 102, thus calculating a difference Sd (=S0−S1) between the recognition scores. The similarity calculating part 110 determines speech data falling within a selection range in which the recognition score difference Sd is greater than a threshold value Sdth (i.e., Sd>Sdth, S0>S1+Sdth) as speech data relatively very similar to the low recognition rate speaker speech dataset 222, and supplies the identification information of this speech data to the data selecting part 112.

In an alternative configuration, the similarity calculating part 110 may determine speech data falling within a selection range in which the recognition score S0 of each piece of speech data in the speech dataset 224 obtained using the low recognition rate speaker acoustic model 106 is greater than a threshold value S0th as speech data very similar to the low recognition rate speaker speech dataset 222, and may supply the identification information of this the speech data to the data selecting part 112.

The data selecting part 112 selects the corresponding speech data (provided with text) from the large-volume speech dataset (provided with texts) 224 in accordance with the identification information thereof. The data selecting part 112 records the selected speech data in the selected speech dataset 232. The number of pieces of data in the selected speech dataset 232 is sufficiently larger than the number of pieces of data in the low recognition rate speaker speech dataset 222, and the selected speech dataset 232 has several hundreds to several thousands of pieces of data (number of vocalizations), for example. Thus, speech data, which is similar to the small-volume low recognition rate speaker speech dataset 222 and the amount of which is preferable to learn, may be selected from the large-volume speech dataset (provided with texts) 224.

The speech recognition score obtained using the low recognition rate speaker acoustic model 106 reflects the degree of similarity between the feature (feature amount space) of the voice of the low recognition rate speaker speech dataset 222 used as learning data or adaptive data for the low recognition rate speaker acoustic model 106 and the feature of the voice of each piece of speech data in the large-volume speech dataset 224 on which speech recognition has been performed.

Further, when the large-volume speech dataset 224 includes a correct answer text, it is preferable to perform continuous word recognition including isolated word recognition in accordance with the correct answer text, e.g., under the constraint that a recognized vocabulary sequence is identical to the correct answer text, so that the influences of false recognition on recognition scores may be reduced.

On the other hand, even if the large-volume speech dataset 224 depicted in FIG. 11 is provided with no text that represents vocalization contents, the similarity calculating part 110 may calculate a recognition score as a degree of similarity by simultaneously estimating vocalization contents by continuous syllable recognition or the like.

Alternatively, a method other than speech recognition may be used in calculating the degree of similarity between speech data in the low recognition rate speaker speech dataset 222 and speech data in the large-volume speech dataset (provided with texts) 224.

The number of pieces of data in the low recognition rate speaker speech dataset 222, the number of pieces of data in the large-volume speech dataset 224, and the number of pieces of data in the learning speech dataset 242 have a relative quantitative relationship, and are therefore not limited to the numbers of pieces of data illustrated in the embodiment.

The other elements and operations of the speech selecting part 100 and the optimal model generating part 300 depicted in FIG. 11 are similar to those of the speech selecting part 100 and the optimal model generating part 300 depicted in FIG. 2.

Furthermore, referring to FIGS. 2 and 11, the mixed speech dataset generating part 322 mixes speech data in the learning speech dataset 242 with speech data in the selected speech dataset 232 in accordance with a mixture rate R decided or adjusted by the mixture rate deciding part 324. Moreover, the mixed speech dataset generating part 322 stores the resulting mixed speech dataset 326 in the speech database 42. The acoustic model generating part 328 carries out acoustic model learning using this mixed speech dataset 326, generates the new acoustic model 330, and stores the generated new acoustic model 330 in the acoustic model database 44.

In this embodiment, mixture of speech data indicates that speech data is extracted as speech dataset (=mixed speech dataset 326) from both of the learning speech dataset 242 and the selected speech dataset 232, and a dataset in which both pieces of speech data are mixed is created. In other words, the mixture does not indicate a mixture or synthesis of waveform data (mixing of contents of respective pieces of speech data). The mixture rate R is a ratio of the total number of pieces of speech data that has been derived from the selected speech dataset 232 and added, to the total number of pieces of data in the generated mixed speech dataset 326, for example. The number of pieces of the speech data to be added may not be equal to or less than the number of pieces of data in the selected speech dataset 232, but may be larger than the number of pieces of data in the selected speech dataset 232. That is, given speech data included in the selected speech dataset 232 may be derived repeatedly more than once.

The model evaluating part 332 performs, using the acoustic model 330, a recognition process on respective pieces of speech data in both the evaluation speech dataset (provided with a correct answer text) 424 including vocalizations of a number of speakers, and the low recognition rate speaker speech dataset 222. The model evaluating part 332 counts the resulting recognition rates, thereby evaluating the performance of this acoustic model 330. The mixture rate deciding part 324 modifies and re-decides the mixture rate R of speech data of the selected speech dataset 232 in the mixed speech dataset 326 based on the degree of similarity or recognition score difference data (Sd) (average value) and/or the number of pieces of selected data C from the similarity calculating part 110, evaluation data (recognition rate or the like) of the model evaluating part 332, and the acoustic model 330 (parameter). In this case, the number of pieces of selected data C represents the number of pieces of data in the selected speech dataset 232.

The mixed speech dataset generating part 322 mixes speech data of the learning speech dataset 242 with that of the selected speech dataset 232 again in accordance with the decided mixture rate R. The mixed speech dataset generating part 322 stores the resulting mixed speech dataset 326 in the speech database 42. The mixed speech dataset generating part 322, the mixture rate deciding part 324, the acoustic model generating part 328, and the model evaluating part 332 repeat the above-described process until an optimal acoustic model is obtained as the acoustic model 330. Thereafter, the model output part 334 stores the acoustic model 330 as the optimal acoustic model 422 in the acoustic model database 44.

In this embodiment, the optimal acoustic model refers to a model for maximizing an optimal degree F. (A1, A2), which indicates whether or not favorable performance is presented, for: a recognition rate A1 ($0 \leq A1 \leq 1$) with respect to the evaluation speech dataset (provided with a correct answer text) 424 including speech data of a number of speakers; and a recognition rate A2 ($0 \leq A2 \leq 1$) with respect to the low recognition rate speaker speech dataset 222.

For example, the optimal degree F. (A1, A2) may be expressed by the following equation as a weighted mean for the recognition rates A1 and A2.

$$F(A1, A2)=0.8 \times A1+0.2 \times A2$$

Further, for the recognition rates A1 and A2, lowest recognition rate threshold values T1 and T2 may be provided, respectively. It is preferable that when the recognition rate A1<T1 or the recognition rate A2<T2, settings are made so that the optimal degree F. (A1, A2)=0, thus preventing the selection of a model whose performance for a general speaker is insufficient, and/or a model whose performance is insufficiently improved for low recognition rate speakers.

In FIG. 1, the speech data selecting and acoustic model generating part 38 of the information processing apparatus 30 derives the optimal acoustic model 422 from the acoustic model database 44, and supplies the derived optimal acoustic model 422 to the information processing apparatus 10. The processor 12 of the information processing apparatus 10 stores, as the acoustic model 22 to be applied, the optimal acoustic model 422 in the memory 20. Thereafter, the speech recognition part 14 performs speech recognition on input speech using the acoustic model 22.

The mixed speech dataset generating part 322 captures at least some or all pieces of speech data in the selected speech dataset 232. The mixed speech dataset generating part 322 receives an initial value R0 of the mixture rate R from the mixture rate deciding part 324. Subsequently, the mixed speech dataset generating part 322 captures a desired number of pieces of speech data in the selected speech dataset 232 so that the mixture rate R=the number of pieces of selected speech data/(the number of pieces of learning speech data+ the number of pieces of selected speech data). Therefore, the mixed speech dataset generating part 322 may repeatedly capture the same speech data in the selected speech dataset 232 for a given number of times.

FIG. 3A depicts an example (Example 1) of the relationship of the mixture rate R with respect to an average value Sd_av of the recognition score difference or degree of similarity difference Sd, which is used by the mixture rate deciding part 324 depicted in FIG. 2 or FIG. 11. In this example, the average value Sd_av of the recognition score difference Sd (=S0−S1) is calculated for the selected speech dataset 232. When the average value Sd_av of the recognition score difference Sd is large, the number C (the number of files or the number of pieces of unit speech data) of pieces of selected data in the selected speech dataset 232 with respect to the number of pieces of data in the current learning speech dataset 242 is thought to be sparse or small. Accordingly, the mixture rate deciding part 324 obtains the mixture rate R so that the mixture rate R of the selected speech dataset 232 is relatively increased by the following equation:

$$R = Sd\_av/Smax \times Rmax$$

where the recognition score difference Smax is an estimated maximum value of the average value Sd_av of the recognition score difference Sd, and the maximum mixture rate Rmax is the maximum value of the mixture rate R. These and other pieces of data and parameters, which are used by the mixture rate deciding part 324, may be stored in the memory 40.

Figure 3B:
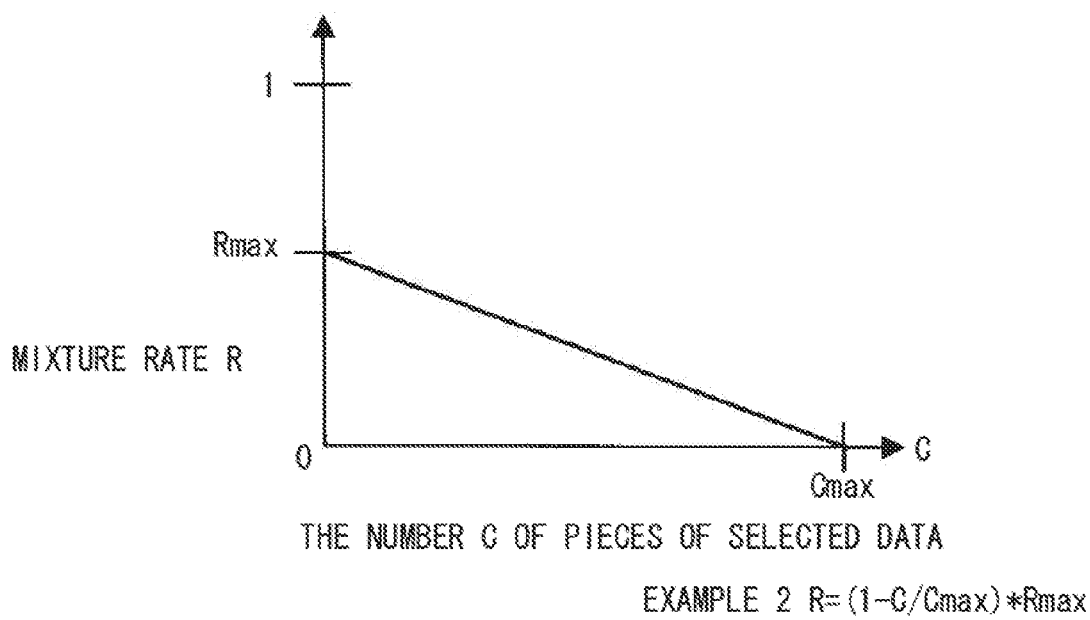
FIG. 3B depicts another example of the relationship of the mixture rate with respect to the number of pieces of data in selected speech dataset, which is used by the mixture rate deciding part depicted in FIG. 2 or FIG. 11.

FIG. 3B depicts another example (Example 2) of the relationship of the mixture rate R with respect to the number of pieces of data C in the selected speech dataset 232, which is used by the mixture rate deciding part 324 depicted in FIG. 2 or FIG. 11. In this example, in accordance with the following equation, the mixture rate deciding part 324 sets the mixture rate R of the selected speech dataset 232 at a higher value when the number of pieces of data C in the selected speech dataset 232 is small. On the other hand, the mixture rate deciding part 324 sets the mixture rate R of the selected speech dataset 232 at a lower value when the number of pieces of data C in the selected speech dataset 232 is large.

$$R = (1 C/Cmax) \times Rmax$$

(where the maximum number Cmax of the selected speech dataset 232 is an estimated maximum value of the number of pieces of data C in the selected speech dataset 232, and the maximum mixture rate Rmax is the maximum value of the mixture rate R)

The fact that the number of pieces of data C in the selected speech dataset 232 is small indicates that the degree of similarity between a voice feature in the low recognition rate speaker speech dataset 222 and a voice feature in the learning speech dataset 242 of a number of speakers is relatively low. Accordingly, in order to further increase the recognition rate of the low recognition rate speaker speech dataset 222, it is recommendable to increase the mixture rate R as described above. To the contrary, the fact that the number of pieces of data C in the selected speech dataset 232 is large indicates that the degree of similarity between a voice feature in the low recognition rate speaker speech dataset 222 and a voice feature in the learning speech dataset 242 is relatively high. Accordingly, the mixture rate R may be small in this case.

In an alternative configuration, the mixture rates R depicted in FIGS. 3A and 3B may be combined, and the average value of both mixture rates R may be obtained by, for example, the following equation:

$$R = (Sd\_av/Smax \times Rmax + (1−C/Cmax) \times Rmax)/2$$

The values such as the maximum mixture rate Rmax, the maximum recognition score Smax and the maximum number of pieces of selected speech data Cmax may be set and stored in the memory 40 by conducting a trial in advance by a designer using various pieces of speech data as the low recognition rate speaker speech dataset 222.

The maximum mixture rate Rmax is decided in advance as the maximum value in the range of the mixture rate R and stored in the memory 40 by a designer. When the mixture rate R exceeds the maximum mixture rate Rmax, it may be estimated that the reduction in a speech recognition rate D with respect to the existing evaluation speech dataset (provided with a correct answer text) 424 deviates from the allowable range.

Next, an example of a method for deciding the mixture rate R will be described. An acoustic model user activates the acoustic model generating part 328 and the model evaluating part 332, and conducts a preliminary experiment while gradually increasing a reduction percentage r until the reduction in a recognition rate D with respect to the existing evaluation speech dataset 424 falls below the allowable range decided in advance by the designer of the optimal model generating part 300. The mixture rate deciding part 324 reduces the number of pieces of data Nt in the learning speech dataset 242 by a given reduction percentage r % (e.g., 10%), and supplies the result to the mixed speech dataset generating part 322 as the percentage (100−r) % of new learning speech data. From the value of the reduction percentage r in this preliminary experiment (<100% is a positive value), the maximum value Rmax of the mixture rate R is decided as follows:

$$Rmax = 1−(100−r)/s/100 \text{ (where } s \text{ represents an adjustment factor)}$$

For example, supposing that the reduction percentage r=20% and the adjustment factor s=1.2, the maximum value of the mixture rate R is Rmax≈0.33. In this case, the adjustment factor s (s≧1) is a factor for converting the reduction percentage r to the maximum mixture rate Rmax. For the adjustment factor s, several values may be tried in advance by a user, and a suitable value is selected and stored as the adjustment factor s in the memory 40.

In a preliminary trial, from an average value μ=Sd_av of recognition score difference Sd and a standard deviation σ, the maximum value Smax of the recognition score S is obtained as the maximum value Smax of the recognition score S=μ+4×σ, and is stored in the memory 40. Furthermore, in a preliminary trial, from an average value μ'(=C_av) of the number of pieces of data C in the selected speech dataset 232 and a standard deviation σ, the maximum number Cmax of the selected speech dataset 232 is obtained as the maximum number of pieces of data Cmax in the selected speech dataset 232=μ'+4×σ, and is stored in the memory 40.

For example, supposing that the average value μ=0.02 and the standard deviation σ=0.01, the maximum value Smax of the recognition score S=0.06.

For example, supposing that the average value μ'=300 and the standard deviation σ=80, the maximum number of pieces of data Cmax in the selected speech dataset 232=620. In this embodiment, the recognition score maximum value Smax and the maximum number of pieces of data Cmax in the selected speech dataset 232 are estimated values, and therefore, it is possible that the score difference Sd≧Smax, and the number of pieces of data C in the selected speech dataset 232≧Cmax.

Accordingly, the maximum value Rmax and minimum value Rmin (>0) of the mixture rate R are decided in advance, and the mixture rate R is modified so that the calculated mixture rate R falls within a range between the maximum value Rmax and the minimum value Rmin.

That is to say, in Example 1 depicted in FIG. 3A, the mixture rate R=Rmax when the score difference average value Sd_av≧Smax.

In Example 2 depicted in FIG. 3B, the mixture rate R=Rmin when the number of pieces of data C in the selected speech dataset 232≧Cmax. Using the number of pieces of data Nt in the learning speech dataset 242 for acoustic model learning, the minimum mixture rate Rmin may be set as follows:

Minimum Mixture Rate $Rmin=1/(Nt+1)$

The mixture rate deciding part 324 updates the mixture rate R in accordance with a result of evaluation (recognition rate) obtained by the model evaluating part 332.

In another example (Example 3), as the recognition rate A % for the low recognition rate speaker speech dataset 222 falls below a target value At %, the mixture rate deciding part 324 updates the mixture rate R of the selected speech dataset 232 to a larger value R' as follows:

$R'=R+(Rmax-R) \times (At-A)/\alpha$ where Rmax represents the maximum value of the mixture rate R, the recognition rate At represents a target recognition rate % of the recognition rate A, and α represents an adjustment factor.

For example, R'=0.108 when the maximum mixture rate Rmax=0.3, the mixture rate R=0.1, the adjustment factor α=500, the target recognition rate At=90% and the recognition rate A=70%.

In still another example (Example 4), as the reduction in the recognition rate D for the evaluation speech dataset 424 (Input D) other than the low recognition rate speaker speech dataset 222 is increased, the mixture rate deciding part 324 updates the mixture rate R of the selected speech dataset 232 to a smaller value R' as follows:

$R'=R-(R/\beta) \times (Dmax-Dt)$ where Dmax represents the maximum value [%] of the reduction in the recognition rate D of speaker-specific speech data in the model evaluating part 332, Dt represents an allowable value [%] of the reduction in the recognition rate D, and β represents an adjustment factor (e.g., 500).

For example, R'=0.184 when the mixture rate R=0.2, the adjustment factor β=100, Dmax=10%, and Dt=2%.

The target recognition rate At and the allowable value Dt of the reduction in the recognition rate D may be decided in advance as performance targets by the designer of the speech recognition part 14 of the information processing apparatus 10, and are stored in the memory 40. The adjustment factors which are α and β serve to decide the update speed of the mixture rate R. For the adjustment factors which are α and β, several values may be tried in advance by the designer, and suitable values may be selected and stored in the memory 40.

When the degree of improvement in evaluation (recognition rate) result of the acoustic model 330 obtained by the model evaluating part 332 is not enhanced beyond a given level even if the mixture rate R is updated, the mixture rate deciding part 324 may end the process of generation of the optimal acoustic model 422. Furthermore, when the generation of the acoustic model 330 is repeated and the total processing time for the generation has exceeded a given maximum processing time, the mixture rate deciding part 324 may end the process of generation of the optimal acoustic model 422.

Figure 4:
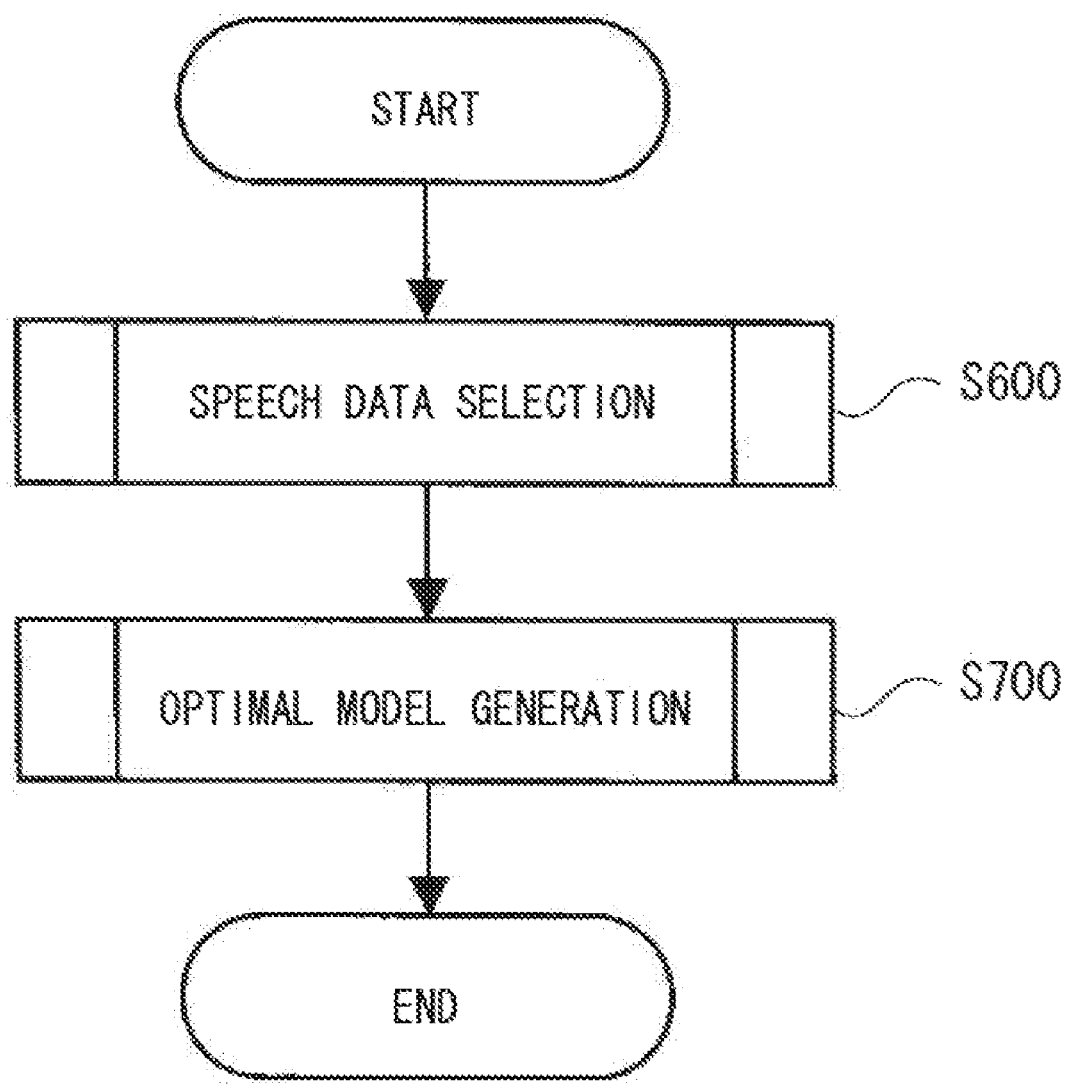
FIG. 4 depicts an example of a brief schematic operation chart for optimal model generation executed by the speech data selecting and acoustic model generating part of an information processing apparatus depicted in FIG. 2 or FIG. 11.

FIG. 4 depicts an example of a schematic operation chart for generating an optimal model in the speech data selecting and acoustic model generating part 38 of the information processing apparatus 30 depicted in FIG. 2 or FIG. 11.

Referring to FIG. 4, at operation S600, the speech selecting part 100 (FIG. 2 or FIG. 11) of the speech data selecting and acoustic model generating part 38 selects and extracts a large number of pieces of selected speech data similar to the small-volume low recognition rate speaker speech dataset 222 from the learning speech dataset 242 or the large-volume speech dataset 224. The speech selecting part 100 records the pieces of selected speech data as the selected speech dataset 232.

At operation S700, the optimal model generating part 300 (FIG. 2 or FIG. 11) of the speech data selecting and acoustic model generating part 38 mixes speech data of the learning speech dataset 242 with that of the selected speech dataset 232 in accordance with the variable mixture rate R, and records the resulting mixed speech data as the mixed speech dataset 326. Furthermore, the optimal model generating part 300 generates and regenerates the acoustic model 330 based on the mixed speech dataset 326, and eventually records the resulting model as the optimal acoustic model 422.

FIG. 5 depicts an example of an operation chart of a process for the speech data selection at operation S600 of FIG. 4, which is executed by the speech selecting part 100 depicted in FIG. 2 or FIG. 11.

At operation S602, the speech selecting part 100 reads the existing acoustic model 102 from the acoustic model database 44. At operation S604, the speech selecting part 100 reads the low recognition rate speaker speech dataset 222 from the speech database 42.

At operation S606, the model adapting part 104 of the speech selecting part 100 modifies the parameter of the existing acoustic model 102 for a frequency spectrum based on the low recognition rate speaker speech dataset 222, thereby adapting the existing acoustic model 102 to the low recognition rate speaker speech dataset 222 and generating the low recognition rate speaker acoustic model 106.

At operation S608, the similarity calculating part 110 of the speech selecting part 100 reads a single piece of unprocessed speech data from the learning speech dataset 242 depicted in FIG. 2 (or from the large-volume speech dataset 224 depicted in FIG. 11). Subsequently, the similarity calculating part 110 performs speech recognition on the single piece of speech data using the existing acoustic model 102 and the low recognition rate speaker acoustic model 106, and calculates, as a degree of similarity, recognition scores S0 and S1 obtained using the respective models.

At operation S610, for this single piece of speech data, the similarity calculating part 110 calculates a recognition score or a degree of similarity difference Sd (=S0−S1) obtained by the existing acoustic model 102 and the low recognition rate speaker acoustic model 106. Based on the recognition score difference Sd, the data selecting part 112 selects speech data relatively similar to the low recognition rate speaker speech dataset 222 from the learning speech dataset 242, and outputs the selected speech data.

At operation S622, the similarity calculating part 110 determines whether or not the processing of Steps 608 to 610 has been finished for the learning speech dataset 242 depicted in FIG. 2 (or all pieces of data in the large-volume speech dataset 224 depicted in FIG. 11). When it is determined that the processing is finished, the procedure exits the subroutine of FIG. 5. When it is determined at operation S622 that the processing is not finished, the procedure returns to the operation S608.

Figure 6A:
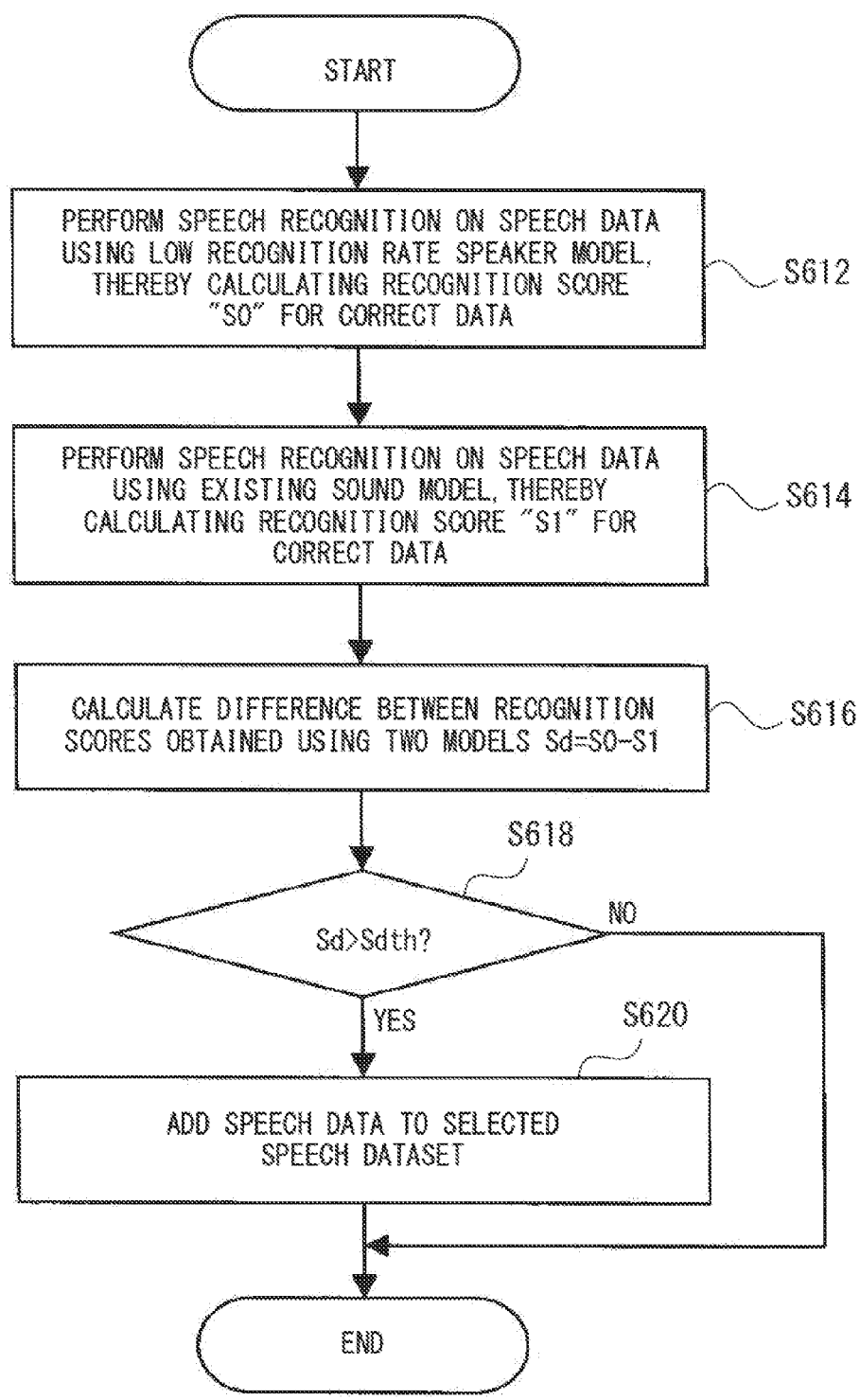
FIG. 6A depicts an example of an operation chart of one process for a degree of similarity calculation at operation S610 of FIG. 5, which is executed by a similarity calculating part and a data selecting part of a speech selecting part depicted in FIG. 2 or FIG. 11.

FIG. 6A depicts an example of an operation chart of a process for the degree of similarity calculation at operation S610 of FIG. 5, which is executed by the similarity calculating part 110 and data selecting part 112 of the speech selecting part 100 depicted in FIG. 2 or FIG. 11.

At operation 612, the similarity calculating part 110 performs speech recognition on the speech data read using the low recognition rate speaker acoustic model 106 (e.g., the speech data read from the dataset 242 of FIG. 2 or the dataset 224 of FIG. 11 at operation S608 of FIG. 5), and calculates the recognition score S0 for this speech data when the recognition result is correct. At operation S614, the similarity calculating part 110 performs speech recognition on this read speech data using the existing acoustic model 102, and calculates the recognition score S1 for this speech data when the recognition result is correct.

At operation S616, the similarity calculating part 110 makes a comparison between the recognition score S0 of this speech data obtained using the low recognition rate speaker acoustic model 106 and the recognition score S1 of this speech data obtained using the existing acoustic model 102, thus calculating the recognition score difference Sd=S0−S1.

At operation S618, the similarity calculating part 110 determines whether or not the difference Sd of the recognition scores is greater than the threshold value Sdth (whether or not Sd>Sdth). When it is determined that the difference Sd of the recognition scores is not greater than the threshold value Sdth, the procedure exits the subroutine of FIG. 6A.

When it is determined at operation 618 that the recognition score difference Sd is greater than the threshold value Sdth, the procedure proceeds to Step 620. At operation S620, the data selecting part 112 determines the speech data having the recognition score difference Sd greater than the threshold value Sdth as speech data relatively similar to the low recognition rate speaker speech dataset 222, and adds the speech data to the selected speech dataset 232.

Figure 6B:
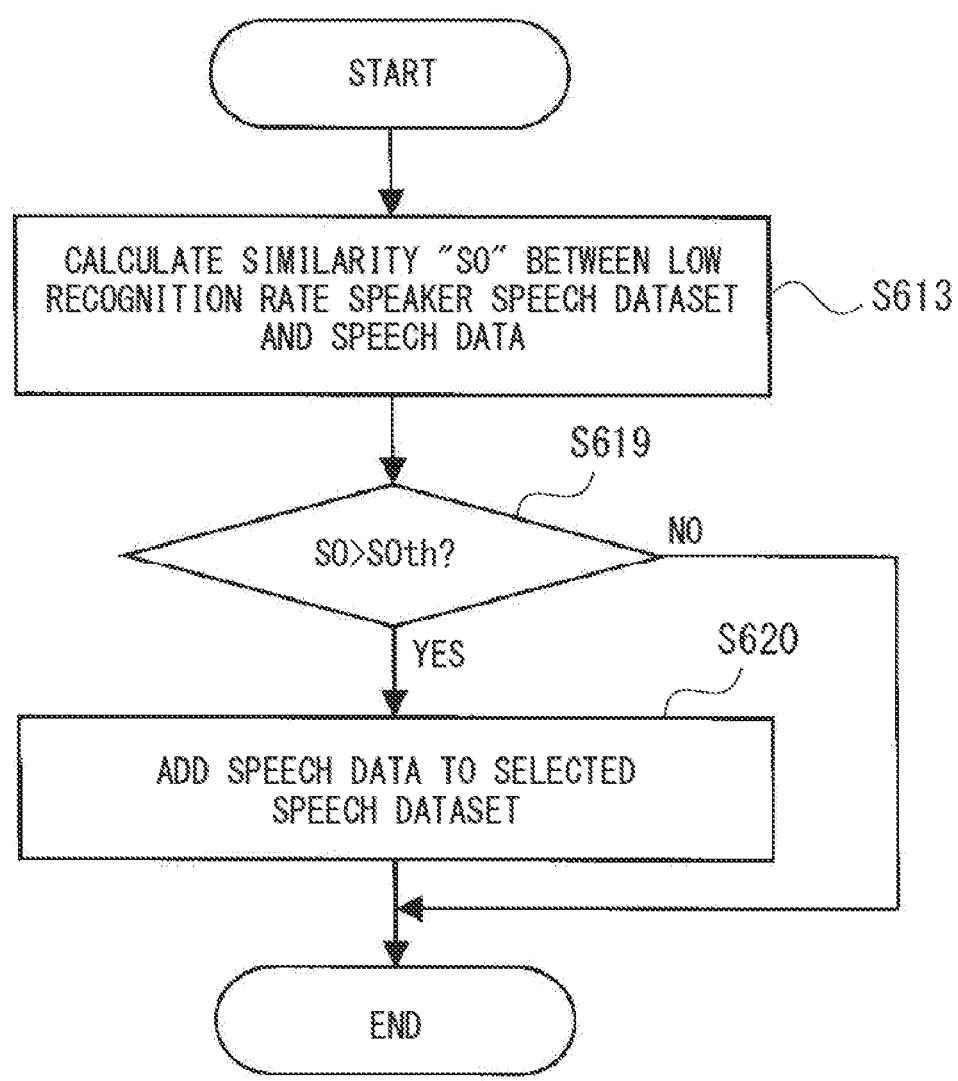
FIG. 6B depicts an example of an operation chart of another process for the degree of similarity calculation at operation S610 of FIG. 5, which is executed by the similarity calculating part and data selecting part of the speech selecting part depicted in FIG. 2 or FIG. 11.

FIG. 6B depicts an example of an operation chart of another process for the degree of similarity calculation at operation S610 of FIG. 5, which is executed by the similarity calculating part 110 and data selecting part 112 of the speech selecting part 100 depicted in FIG. 2 or FIG. 11.

At operation S613, the similarity calculating part 110 performs speech recognition on the speech data read using the low recognition rate speaker acoustic model 106 (e.g., the speech data read from the dataset 242 of FIG. 2 or the dataset 224 of FIG. 11 at operation S608 of FIG. 5), and calculates a recognition score S0 as the degree of similarity for this speech data when the recognition result is correct. In an alternative configuration, the similarity calculating part 110 may calculate a degree of similarity S0 between the low recognition rate speaker speech dataset 222 and the read speech data (at operation 608 of FIG. 5) using a method other than speech recognition as described above.

At operation S619, the similarity calculating part 110 determines whether or not the degree of similarity S0 is greater than the threshold value S0th (whether or not S0>S0th). When it is determined that the degree of similarity S0 is not greater than the threshold value S0th, the procedure exits the subroutine of FIG. 6B.

When it is determined at operation S619 that the degree of similarity S0 is greater than the threshold value S0th, the data selecting part 112 adds the speech data (read from the dataset 242 of FIG. 2 or the dataset 224 of FIG. 11), having the degree of similarity S0 greater than the threshold value S0th, to the selected speech dataset 232 at operation S620.

FIG. 7 depicts an example of a schematic operation chart of a process for the optimal model generation at operation S700 of FIG. 4, which is executed by the optimal model generating part 300 depicted in FIG. 2 or FIG. 11.

At operation S702, the mixture rate deciding part 324 decides the initial mixture rate R0 of the selected speech dataset 232 with respect to the learning speech dataset 242.

At operation S710, the mixed speech dataset generating part 322 derives at least some or all pieces of speech data in the learning speech dataset 242, and records the derived speech data in the mixed speech dataset 326. Subsequently, the mixed speech dataset generating part 322 mixes speech data of the selected speech dataset 232 with this recorded speech data in accordance with the mixture rate R received from the mixture rate deciding part 324, and records the resulting mixed speech data, thereby eventually generating the mixed speech dataset 326. At first, the mixture rate R is the initial mixture rate R0.

At operation S720, the acoustic model generating part 328 generates the acoustic model 330 by performing a learning process based on the mixed speech dataset 326.

At operation S730, using the acoustic model 330, the model evaluating part 332 performs speech recognition on respective pieces of speech data in the low recognition rate speaker speech dataset 222 and the evaluation speech dataset 424, and calculates recognition rates to generate evaluation result data.

At operation S752, the mixture rate deciding part 324 determines whether or not the generation of the acoustic model (330) may be finished. When it is determined at operation S752 that the generation of the acoustic model is preferably not finished, the mixture rate deciding part 324 decides, at operation S754, the new mixture rate R in accordance with an evaluation result obtained by the model evaluating part 332.

When it is determined at operation S752 that the generation of the acoustic model is preferably finished, the model output part 334 outputs, at operation S756, the acoustic model 330 as the optimal acoustic model 422, and stores the model in the acoustic model database 44. Then, the procedure exits this routine.

Figure 8:
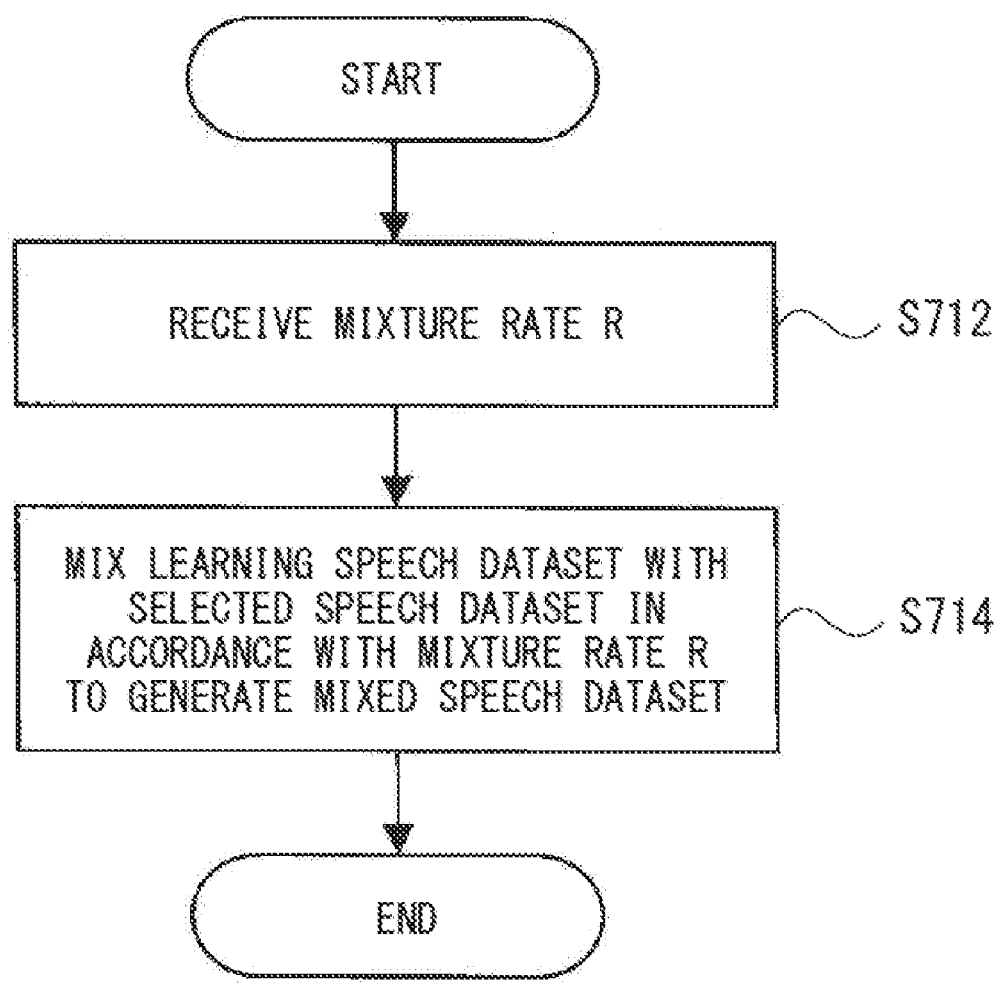
FIG. 8 depicts an example of an operation chart of a process for speech data mixture at operation S710 of FIG. 7, which is executed by a mixed speech dataset generating part depicted in FIG. 2 or FIG. 11.

FIG. 8 depicts an example of an operation chart of a process for the speech data mixture at operation S710 of FIG. 7, which is executed by the mixed speech dataset generating part 322 depicted in FIG. 2 or FIG. 11.

At operation S712, the mixed speech dataset generating part 322 receives the current mixture rate R of the selected speech dataset 232 from the mixture rate deciding part 324.

At operation S714, the mixed speech dataset generating part 322 extracts speech data from the learning speech dataset 242 and the selected speech dataset 232 in accordance with the mixture rate R, and mixes both pieces of the speech data according to the mixture rate R, thereby generating the mixed speech dataset 326. The mixed speech dataset generating part 322 stores the mixed speech dataset 326 in the speech database 42.

Figure 9:
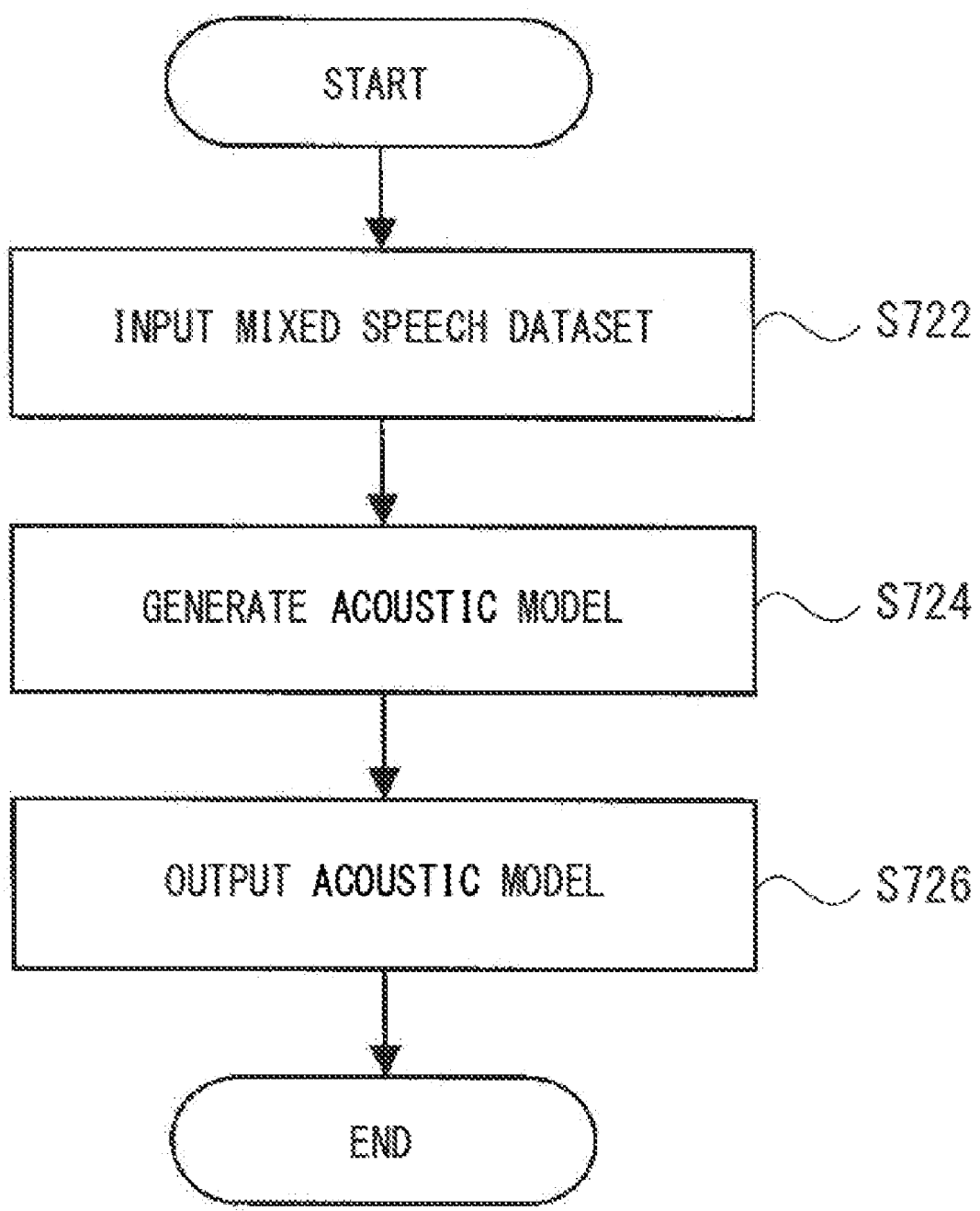
FIG. 9 depicts an example of an operation chart of a process for acoustic model generation at operation S720 of FIG. 7, which is executed by an acoustic model generating part depicted in FIG. 2 or FIG. 11.

FIG. 9 depicts an example of an operation chart of a process for the acoustic model generation at operation S720 of FIG. 7, which is executed by the acoustic model generating part 328 depicted in FIG. 2 or FIG. 11.

At operation S722, the acoustic model generating part 328 derives the mixed speech dataset 326 from the speech database 42, and inputs the derived mixed speech dataset 326.

At operation S724, the acoustic model generating part 328 generates the acoustic model 330 by a known method using the mixed speech dataset 326.

At operation S726, the acoustic model generating part 328 outputs the generated acoustic model 330, and stores the model in the acoustic model database 44.

Figure 10:
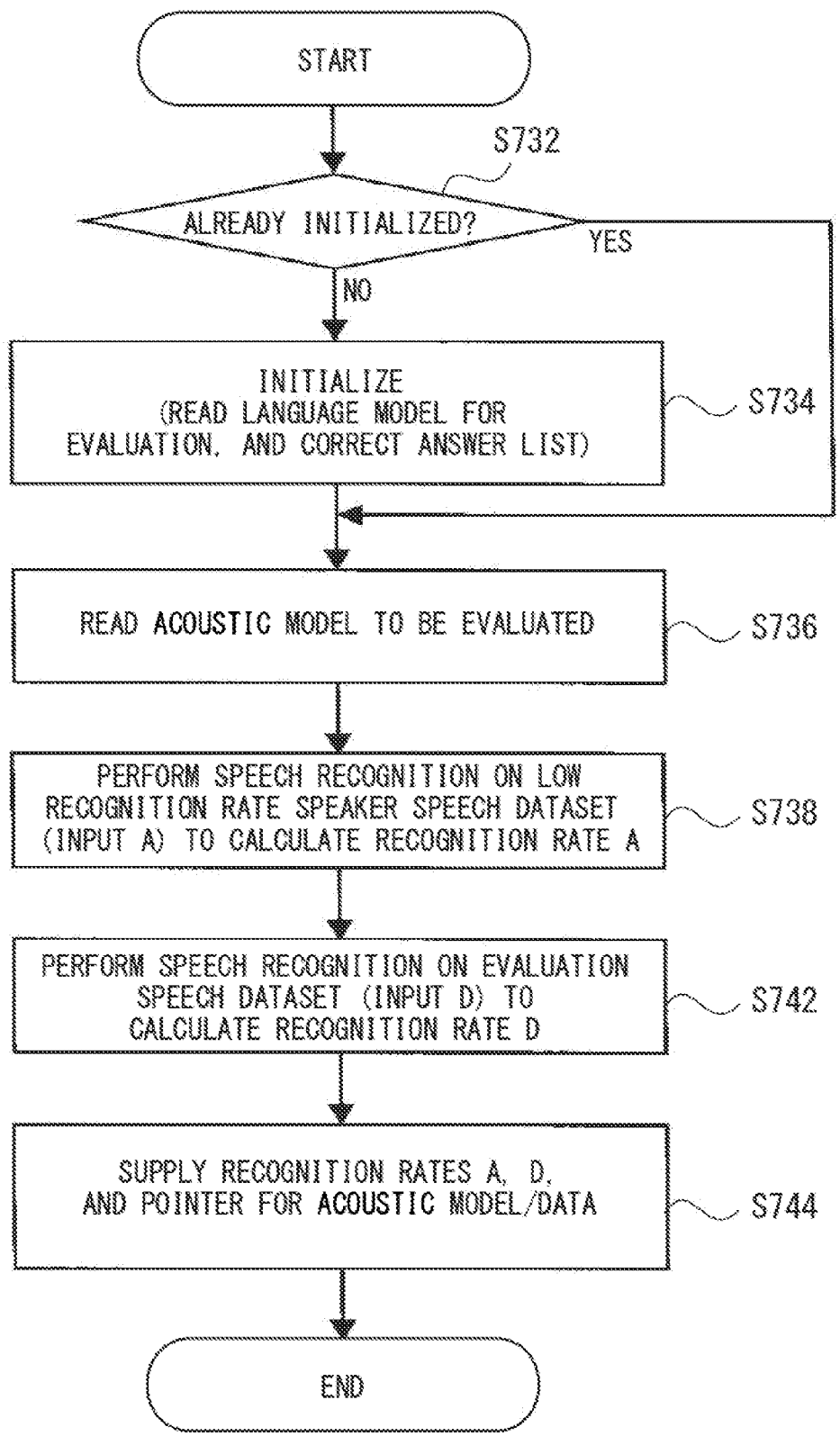
FIG. 10 depicts an example of an operation chart of a process for acoustic model evaluation at operation S730 of FIG. 7, which is executed by a model evaluating part depicted in FIG. 2 or FIG. 11.

FIG. 10 depicts an example of an operation chart of a process for the acoustic model evaluation at operation S730 of FIG. 7, which is executed by the model evaluating part 332 depicted in FIG. 2 or FIG. 11.

At operation S732, the model evaluating part 332 determines whether or not a language model for evaluation and a correct answer list are already initialized. When it is determined that the language model and the correct answer list are already initialized, the procedure proceeds to the operation S736.

When it is determined at operation S732 that the language model for evaluation and the correct answer list are not initialized, the model evaluating part 332 reads, at operation S734, a language model for evaluation and a correct answer list from the acoustic model database 44, thus initializing the model evaluating part 332 itself.

At operation S736, the model evaluating part 332 reads, from the acoustic model database 44, the acoustic model 330 to be evaluated.

At operation S738, the model evaluating part 332 performs speech recognition on each piece of speech data of the low recognition rate speaker speech dataset 222 (Input A) to calculate the recognition rate A.

At operation S742, the model evaluating part 332 performs speech recognition on each piece of speech data of the evaluation speech dataset 424 (Input D) to calculate the recognition rate D.

At operation S744, the model evaluating part 332 supplies the recognition rates A and D and a pointer or identification information for data (parameter) of the acoustic model 330 to the mixture rate deciding part 324.

According to the embodiment described thus far, an acoustic model that enables successful recognition of not only the speech of a standard or a majority of speakers but also the speech of a minority of speakers is generated.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An information apparatus that generates a first acoustic model for speech recognition, the information apparatus comprising:
a first speech dataset configured to store speech data uttered by low recognition rate speakers;
a second speech dataset configured to store speech data uttered by a plurality of speakers;
a third speech dataset configured to store ring speech data to be mixed with the speech data of the second speech dataset;
a similarity calculating part configured to obtain, for each piece of the speech data in the second speech dataset, a degree of similarity to a given average voice in the first speech dataset;
a speech data selecting part configured to record the speech data in the second speech dataset, the degree of similarity of which is within a given selection range, as selected speech data in the third speech dataset; and
an acoustic model generating part configured to generate a first acoustic model using the speech data recorded in the second speech dataset and the third speech dataset.

2. The information apparatus according to claim 1, the information apparatus further comprising:
a mixed speech dataset generating part configured to generate a fifth speech dataset by mixing speech data of the second speech dataset with speech data of the third speech dataset in accordance with a mixture rate,
wherein the acoustic model generating part generates the first acoustic model using the fifth speech dataset.

3. The information apparatus according to claim 2, the information apparatus further comprising a mixture rate deciding part adjusting a value of the mixture rate in accordance with recognition rates obtained by performing, using the first acoustic model, speech recognition on respective pieces of speech data in a sixth speech dataset and in the first speech dataset for evaluation.

4. The information apparatus according to claim 3, wherein, when the first acoustic model is not improved beyond a threshold level even if the value of the mixture rate is adjusted or when a given period of time has elapsed since the start of generation of the first acoustic model, the mixture rate deciding part specifies the current first acoustic model as a final acoustic model.

5. The information apparatus according to claim 3, wherein the mixture rate deciding part calculates the value of the mixture rate in accordance with the number of pieces of data in the third speech dataset.

6. The information apparatus according to claim 2, wherein, when the first acoustic model is not improved beyond a threshold level even if the value of the mixture rate is adjusted or when a given period of time has elapsed since the start of generation of the first acoustic model, the mixture rate deciding part specifies the current first acoustic model as a final acoustic model.

7. The information apparatus according to claim 6, wherein the mixture rate deciding part calculates the value of the mixture rate in accordance with the number of pieces of data in the third speech dataset.

8. The information apparatus according to claim 2, wherein, when the first acoustic model is not improved beyond a threshold level even if the value of the mixture rate is adjusted or when a given period of time has elapsed since the start of generation of the first acoustic model, the mixture rate deciding part specifies the current first acoustic model as a final acoustic model.

9. An information apparatus that generates a first acoustic model for speech recognition, the information apparatus comprising:
a first speech dataset configured to store speech data uttered by low recognition rate speakers;
a second speech dataset configured to store speech data uttered by a plurality of speakers;

a fourth speech dataset configured to store speech data serving as a candidate to be mixed with speech data of the second speech dataset;

a third speech dataset configured to store speech data that is derived from the fourth speech dataset and mixed with speech data of the second speech dataset;

a similarity calculating part configured to obtain, for each piece of speech data in the fourth speech dataset, a degree of similarity to a given average voice in the first speech dataset;

a speech data selecting part configured to record the speech data in the fourth speech dataset, the degree of similarity of which is within a selection range, as selected speech data in the third speech dataset; and an acoustic model generating part configured to generate a first acoustic model using the speech data recorded in the second speech dataset and the third speech dataset.

10. The information apparatus according to claim 9, wherein, for each piece of speech data in the fourth speech dataset, the degree of similarity calculating part obtains the degree of similarity as a first degree of similarity, and obtains a second degree of similarity to the given average voice in the second speech dataset, and wherein the speech data selecting part records the speech data, in which a difference between the first degree of similarity and the second degree of similarity is within a given selection range, as the selected speech data in the third speech dataset.

11. The information apparatus according to claim 10, the information apparatus further comprising:

a mixed speech dataset generating part configured to generate a fifth speech dataset by mixing speech data of the second speech dataset with speech data of the third speech dataset in accordance with a mixture rate; and a mixture rate deciding part configured to adjust a value of the mixture rate in accordance with recognition rates obtained by performing, using the first acoustic model, speech recognition on respective pieces of speech data in a sixth speech dataset and in the first speech dataset for evaluation, wherein the mixture rate deciding part calculates the value of the mixture rate in accordance with the magnitude of an average value of a difference between the first degree of similarity and the second degree of similarity, and wherein the acoustic model generating part generates the first acoustic model using the fifth speech dataset.

12. The information apparatus according to claim 11, wherein the mixture rate deciding part calculates the value of the mixture rate in accordance with the number of pieces of data in the third speech dataset.

13. The information apparatus according to claim 9, the information apparatus further comprising:

a model adapting part configured to generate a third acoustic model of the low recognition rate speakers by performing a process for adapting a second acoustic model to the first speech dataset, the second acoustic model being generated using the second speech dataset, wherein the similarity calculating part further includes a speech recognition part performing speech recognition on respective pieces of speech data in the second speech dataset using the third acoustic model and the second acoustic model, thereby obtaining recognition scores of the respective pieces of speech data as the first degree of similarity and the second degree of similarity.

14. The information apparatus according to claim 13, the information apparatus further comprising:

a mixed speech dataset generating part configured to generate a fifth speech dataset by mixing speech data of the second speech dataset with speech data of the third speech dataset in accordance with a mixture rate; and a mixture rate deciding part configured to adjust a value of the mixture rate in accordance with recognition rates obtained by performing, using the first acoustic model, speech recognition on respective pieces of speech data in a sixth speech dataset and in the first speech dataset for evaluation, wherein the mixture rate deciding part calculates the value of the mixture rate in accordance with the magnitude of an average value of a difference between the first degree of similarity and the second degree of similarity, and wherein the acoustic model generating part generates the first acoustic model using the fifth speech dataset.

15. The information apparatus according to claim 13, the information apparatus further comprising:

a second acoustic model generated using the second speech dataset; and a model adapting part configured to perform a process for adapting the second acoustic model to the first speech dataset for a frequency spectrum, and configured to generate a third acoustic model of the low recognition rate speakers, wherein the similarity calculating part further includes a speech recognition part recognizing each piece of speech data in the fourth speech dataset using the third acoustic model, and obtains a resulting recognition score as the degree of similarity.

16. The information apparatus according to claim 9, the information apparatus further comprising:

a mixed speech dataset generating part configured to generate a fifth speech dataset by mixing speech data of the second speech dataset with speech data of the third speech dataset in accordance with a mixture rate, wherein the acoustic model generating part generates the first acoustic model using the fifth speech dataset.

17. The information apparatus according to claim 16, the information apparatus further comprising a mixture rate deciding part adjusting a value of the mixture rate in accordance with recognition rates obtained by performing, using the first acoustic model, speech recognition on respective pieces of speech data in a sixth speech dataset and in the first speech dataset for evaluation.

18. The information apparatus according to claim 16, wherein, when the first acoustic model is not improved beyond a threshold level even if the value of the mixture rate is adjusted or when a given period of time has elapsed since the start of generation of the first acoustic model, the mixture rate deciding part specifies the current first acoustic model as a final acoustic model.

19. A non-transitory computer-readable recording medium storing a computer program for causing a computer including a processor and a memory to function as an information apparatus, the computer program causing the computer to execute operations of:

storing a first speech dataset storing speech data uttered by low recognition rate speakers, a second speech dataset storing speech data uttered by a plurality of speakers, and a third speech dataset storing speech data that is mixed with speech data of the second speech dataset, the first, second, and third speech datasets being stored in the memory by the processor;

obtaining, for each piece of speech data in the second speech dataset, a degree of similarity to a given average voice in the first speech dataset, by the processor;

recording the speech data in the second speech dataset, the degree of similarity of which is within a given selection range, as selected speech data in the third speech dataset, by the processor;

and generating an acoustic model by the processor using the speech data recorded in the second speech dataset and the third speech dataset.

20. A method for making a computer program cause a computer including a processor and a memory to function as an information apparatus, the method comprising:

storing a first speech dataset storing speech data uttered by low recognition rate speakers, a second speech dataset storing speech data uttered by a plurality of speakers, and a third speech dataset storing speech data that is mixed with speech data of the second speech dataset, the first, second and third speech datasets being stored in the memory by the processor;

obtaining, for each piece of speech data in the second speech dataset, a degree of similarity to a given average voice in the first speech dataset by the processor;

recording the speech data in the second speech dataset, the degree of similarity of which is within a given selection range, as selected speech data in the third speech dataset by the processor; and generating an acoustic model by the processor using the speech data recorded in the second speech dataset and the third speech dataset by the processor.

* * * * *